United States Patent
Henriksen et al.

(10) Patent No.: US 9,176,824 B1
(45) Date of Patent: Nov. 3, 2015

(54) METHODS, APPARATUS AND SYSTEMS FOR DISPLAYING RETRIEVED FILES FROM STORAGE ON A REMOTE USER DEVICE

(75) Inventors: Gordon T. Henriksen, Lynn, MA (US); Jeffry C. Flowers, Marblehead, MA (US)

(73) Assignee: Carbonite, Inc., Boston, MA (US)

( * ) Notice: Subject to any disclaimer, the term of this patent is extended or adjusted under 35 U.S.C. 154(b) by 701 days.

(21) Appl. No.: 13/046,609

(22) Filed: Mar. 11, 2011

Related U.S. Application Data

(60) Provisional application No. 61/313,478, filed on Mar. 12, 2010, provisional application No. 61/424,536, filed on Dec. 17, 2010.

(51) Int. Cl.
| | | |
|---|---|---|
| *G06F 12/00* | (2006.01) | |
| *G06F 11/14* | (2006.01) | |
| *G06F 12/08* | (2006.01) | |

(52) U.S. Cl.
CPC ........ *G06F 11/1448* (2013.01); *G06F 11/1461* (2013.01); *G06F 12/0868* (2013.01)

(58) Field of Classification Search
USPC ........................................................ 711/141
See application file for complete search history.

(56) References Cited

U.S. PATENT DOCUMENTS

| | | | |
|---|---|---|---|
| 5,638,509 A | 6/1997 | Dunphy et al. | |
| 6,065,018 A | 5/2000 | Beier et al. | |
| 6,611,850 B1 | 8/2003 | Shen | |
| 6,640,217 B1 | 10/2003 | Scanlan et al. | |
| 6,789,122 B1 | 9/2004 | Slaughter et al. | |
| 7,284,104 B1 | 10/2007 | Wu et al. | |
| 7,363,316 B2 | 4/2008 | Anderson et al. | |
| 7,363,446 B2 | 4/2008 | Higaki et al. | |
| 7,444,485 B1 | 10/2008 | St. Pierre et al. | |
| 7,483,926 B2 | 1/2009 | Chandhok et al. | |
| 7,519,634 B2 | 4/2009 | Nichols et al. | |
| 7,739,363 B1 | 6/2010 | Gaya | |
| 7,769,805 B1* | 8/2010 | Barnes et al. ................. 709/203 |
| 7,797,278 B2 | 9/2010 | Katoh et al. | |
| 7,962,657 B1 | 6/2011 | Zimran et al. | |
| 8,010,760 B2 | 8/2011 | Maki et al. | |
| 8,112,396 B2 | 2/2012 | Zak et al. | |
| 8,296,263 B2 | 10/2012 | Zamkoff et al. | |
| 8,612,703 B2 | 12/2013 | Maki et al. | |
| 8,631,088 B2 | 1/2014 | Robbin et al. | |
| 2004/0078641 A1 | 4/2004 | Fleischmann | |
| 2005/0108289 A1 | 5/2005 | East et al. | |

(Continued)

OTHER PUBLICATIONS

Peek et al. "EnsemBlue: Integrating Distributed Storage and Consumer Electronics", OSDI '06: 7th USENIX Symposium on Operating Systems Design and Implementation, 2006.*

(Continued)

*Primary Examiner* — Gurtej Bansal
*Assistant Examiner* — Brendan Lillis
(74) *Attorney, Agent, or Firm* — Foley and Lardner LLP; John D. Lanza

(57) ABSTRACT

The remote access to backed-up user data techniques include a method, a system, and/or an apparatus. In some embodiments of these techniques, the method includes receiving a request from a user interface to view a backed-up data. The method further includes retrieving a cache entry corresponding to the backed-up data from a cache, displaying contents of the backed-up data in the user interface using the retrieved cache entry, and validating the cache entry after displaying the contents of the backed-up data.

27 Claims, 42 Drawing Sheets

(56) References Cited

U.S. PATENT DOCUMENTS

| | | |
|---|---|---|
| 2005/0131990 A1 | 6/2005 | Jewell |
| 2005/0244005 A1 | 11/2005 | Grigorovitch et al. |
| 2006/0136964 A1 | 6/2006 | Diez et al. |
| 2007/0033569 A1* | 2/2007 | Davidson et al. ............. 717/103 |
| 2007/0044157 A1 | 2/2007 | Taguchi et al. |
| 2007/0136200 A1 | 6/2007 | Frank et al. |
| 2007/0136442 A1* | 6/2007 | Palma et al. .................. 709/219 |
| 2007/0146788 A1 | 6/2007 | Shinozaki et al. |
| 2007/0226169 A1 | 9/2007 | Solyanik et al. |
| 2007/0266059 A1 | 11/2007 | Kitamura |
| 2008/0052328 A1 | 2/2008 | Widhelm et al. |
| 2008/0133622 A1* | 6/2008 | Brown et al. ................. 707/204 |
| 2008/0222628 A1* | 9/2008 | Batra et al. ................... 717/171 |
| 2008/0250024 A1* | 10/2008 | Kvm et al. ...................... 707/10 |
| 2008/0250215 A1 | 10/2008 | Shitomi |
| 2009/0164529 A1 | 6/2009 | McCain |
| 2009/0228779 A1* | 9/2009 | Williamson et al. .......... 715/233 |
| 2011/0069941 A1 | 3/2011 | Takao et al. |
| 2011/0113084 A1 | 5/2011 | Ramnani |
| 2011/0161291 A1 | 6/2011 | Taleck et al. |
| 2011/0161297 A1 | 6/2011 | Parab |
| 2012/0173673 A1 | 7/2012 | Dietrich et al. |
| 2012/0239892 A1 | 9/2012 | Peters et al. |
| 2012/0246472 A1* | 9/2012 | Berengoltz et al. ............ 713/165 |
| 2012/0310956 A1* | 12/2012 | Huhn ............................ 707/754 |
| 2013/0024581 A1 | 1/2013 | Myhill et al. |
| 2013/0212437 A1 | 8/2013 | Timashev et al. |
| 2013/0238850 A1 | 9/2013 | Lam |
| 2013/0283049 A1 | 10/2013 | Brown et al. |
| 2014/0222972 A1 | 8/2014 | Thomas et al. |

OTHER PUBLICATIONS

Zheng et al. "Design a cloud storage platform for pervasive computing environments", Cluster Comput 13, 141-151, Nov. 15, 2009.*

Mei et al., "Adaptive File Cache Management for Mobile Computing", Mobile Data Management, 2003, vol. 2574, pp. 369-373, 5 pages.

Tolvanen et al., "Remote Storage for Mobile Devices", First International Conference on Communication System Software and Middleware (COMSWARE), 2006, 9 pages.

Wang et al., "An Improved Cache Invalidation Schema Based on Mobile Agent", $2^{nd}$ International Conference on Future Computer and Communication (ICFCC), May 21-24, 2010, pp. V1-7-V1-9, 3 pages.

Wang et al., "SACCS: Scalable Asynchronous Cache Consistency Scheme for Mobile Environments", $23^{rd}$ International Conference on Distributed Computing Systems Workshops, May 19-22, 2003, pp. 797-802, 6 pages.

Zeitunlian et al., "An Efficient Cache Replacement Strategy for the Hybrid Cache Consistency Approach", World Academy of Science, Engineering and Technology, Mar. 2010, Issue 63, pp. 268-273, 6 pages.

Office Action on U.S. Appl. No. 13/046,589 dated Oct. 4, 2013.
Office Action on U.S. Appl. No. 13/046,589 dated Dec. 19, 2012.
Office Action on U.S. Appl. No. 13/046,589 dated Jun. 17, 2013.
Notice of Allowance on U.S. Appl. No. 13/046,589 dated Apr. 1, 2014.
US Office Action for U.S. Appl. No. 13/046,582 dated Aug. 21, 2014.

* cited by examiner

```
FileStatus.xml - Notepad
File Edit Format View Help
<?xml version="1.0" encoding="utf-8"?>
<StatusFile
  Name="MyDocument.docx"
  Path="C:\Users\Administrator\Documents\"
  SizeInBytes="2097152"
  LastModified="03/08/2010 16:57"
  LastBackup="03/09/2010 11:24"
>
  <MappingToPhysicalFile>
    <Location Address="0x6C9016B7" Length="131072"/>
    <Location Address="0x6C7AD6B7" Length="131072"/>
    <Location Address="0x7CB616B7" Length="131072"/>
    <Location Address="0x5761FD7"  Length="131072"/>
    <Location Address="0x6C45FDB7" Length="131072"/>
    <Location Address="0x23B616B7" Length="131072"/>
    <Location Address="0x69B616B7" Length="131072"/>
    <Location Address="0x0CB642B7" Length="131072"/>
    <Location Address="0x6CB616EF" Length="131072"/>
    <Location Address="0x6CB616B2" Length="131072"/>
    <Location Address="0xOCDEF6B6" Length="131072"/>
    <Location Address="0x6C0764BD" Length="131072"/>
    <Location Address="0x6EDF00B7" Length="131072"/>
    <Location Address="0x6CB61676" Length="131072"/>
  </MappingToPhysicalFile>
</StatusFile>
```

1900a
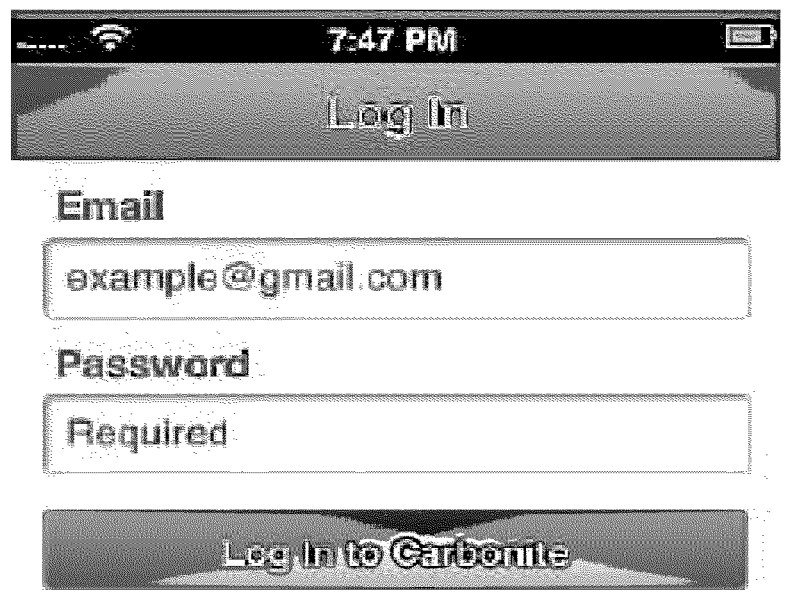
*New to Carbonite? Start your free trial.*
FIG. 19A

1900j

METHODS, APPARATUS AND SYSTEMS FOR DISPLAYING RETRIEVED FILES FROM STORAGE ON A REMOTE USER DEVICE

CROSS REFERENCE

This application claims the benefit of U.S. Prov. No. 61/424,536, entitled "Methods, Apparatus, and Systems for Remote File Access," filed Dec. 17, 2010 and U.S. Prov. 61/313,478, entitled "Remote File Access Utilizing a Web Interface," filed Mar. 12, 2010, both of which are hereby incorporated by reference in their entirety.

FIELD OF THE INVENTION

The present invention relates generally to computer-based methods, systems and apparatuses for remotely accessing user data that was backed-up.

BACKGROUND

Loss of sensitive and valuable data stored in computer systems in home and work environments is common. The computer data is vulnerable to theft, natural disasters, hard drive failures, malicious virus attacks, and even accidental deletion by the user. Conventional data backup techniques include offline backup methods as well as online backup methods. The offline backup approach typically involves backing up data on-site, using on-site hardware and media such as compact discs, digital discs, external hard drives, etc. However, the offline backup approach does not allow the user to remotely access backed-up data without having the medium storing the backed-up data.

In contrast to the offline data backup approach, the online data backup approach involves backing up data over a network connection to a remote location. Various online backup services provide users with solutions for automatically and securely backing up user data. The online backup services typically include a backup client software program that collects and transfers computer files from a client device to remote servers managed by the remote backup service providers.

Some of the existing online backup services (e.g., SugarSync) allow users to remotely access backed-up files from any computer, where Internet is available, using a web-based interface. To allow for remote user access to backed-up files stored in remote storage, online backup services typically employ server-based directories or file systems to determine location of the backup files. For example, the U.S. Patent Application Pub. No. US 2008/0052328 discloses a server application that decouples metadata from encrypted object data, stores the metadata in a server relational file system, and stores the binary object in a server storage repository. The meta data associated with encrypted object data is disclosed to include file information (e.g., title, subject, author, format, size of the file, etc.), as well as operational metadata (e.g., physical location or locations of each binary object, encryption information including encryption method and encryption key, compression method, and relationship to other objects in the system). Accordingly, retrieval of the encrypted object is facilitated by the operational metadata stored in the relational file system of the remote server.

In addition, users may remotely access backed-up data using portable devices such as mobile phones. Caching data at the mobile client is an important technique for improving performance and relieving bandwidth constraints prevalent in mobile environments. Maintaining copies of remotely backed-up data in the local memory of the mobile device reduces user requests to retrieve data from the server.

Various cache invalidation strategies ensure that the data stored in the cache of the mobile device is consistent with the data stored on the server. Some of the cache invalidation strategies involve the server notifying the client device of changed files by issuing invalidation reports. Alternatively, the client checks the validity of the cached data upon expiration of a predefined cached data lifetime.

SUMMARY

In contrast to the conventional online backup services employing server-based directories or files systems to determine storage location of the backup files, the inventor has recognized and appreciated that client backup status files corresponding to backed-up files may be generated and maintained by the client software application. In various aspects of exemplary inventive embodiments, for each file selected for backup to a remote backup system, the client software application generates one or more backed-up file segments, and individually encrypts each of these backed-up file segments before transmitting to the remote system for storage. In exemplary implementations, backup status files associated with the backed-up files are maintained by the client and include information necessary to locate the one or more backed-up file segments in remote storage and piece these backed-up file segments together into the corresponding backed-up files.

In addition, to improve user experience with client software applications allowing for remote access to backed-up data, the inventor has recognized and appreciated that cache validation is critical for ensuring fast remote data access and display. In exemplary embodiments, validation of a cache maintained by the client software application is performed asynchronously. When the user requests to access a particular backed-up data, the client software application may retrieve the backed-up data from the local cache, display the backed-up data, and only then validate the cache entry associated with the backed-up data. This cache validation technique is especially helpful in the mobile environment where network delays are prevalent.

One embodiment of the present invention is directed to a computer-implemented method for facilitating remote access to a backed-up data. The method is performed in a user device comprising at least one processor, at least one memory, and at least one communication interface. The backed-up data is backed-up on a data center communicatively coupled to a backup system management server. The method comprises receiving a request from a user interface to view the backed-up data, wherein the user interface is accessed by the user from the user device. The method further comprises retrieving a cache entry corresponding to the backed-up data from a cache stored in the at least one memory. The method further comprises displaying contents of the backed-up data in the user interface using the retrieved cache entry. The method further comprises validating the cache entry after the contents are displayed.

Another embodiment is directed to an apparatus for facilitating remote access from a user device to a backed-up data stored on a first user device. The backed-up data is backed-up as one or more backed-up first file segments stored on a data center communicatively coupled to the backup system management server. The apparatus comprises at least one communications interface, at least one memory to store processor-executable instructions, and at least one processor communicatively coupled to the at least one communications interface and the at least one memory. Upon execution of the processor-executable instructions, the at least one processor receives a request from a user interface to view the backed-up data, wherein the user interface is accessed by the user from the user device. The at least one processor also retrieves a cache entry corresponding to the backed-up data from a cache stored in the at least one memory. The at least one processor also displays contents of the backed-up data in the user interface using the retrieved cache entry. The at least one processor also validates the cache entry after the content is displayed.

Another embodiment is directed to a non-transitory computer readable storage medium encoded with processor-executable instructions that, when executed by at least one processor, perform a method for facilitating remote access to a backed-up data stored on a second user device. The first backed-up data is backed-up on a data center communicatively coupled to a backup system management server. The method comprises receiving a request from a user interface to view the backed-up data, wherein the user interface is accessed by the user from the user device. The method further comprises retrieving a cache entry corresponding to the backed-up data from a cache stored in the at least one memory. The method further comprises displaying contents of the backed-up data in the user interface using the retrieved cache entry. The method further comprises validating the cache entry after the content is displayed.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which:

FIG. 12 illustrates an exemplary backup status file, according to one embodiment of the present invention;

FIGS. 19A-19L illustrate exemplary mobile phone user interfaces facilitating remote data access, according to one exemplary embodiment.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
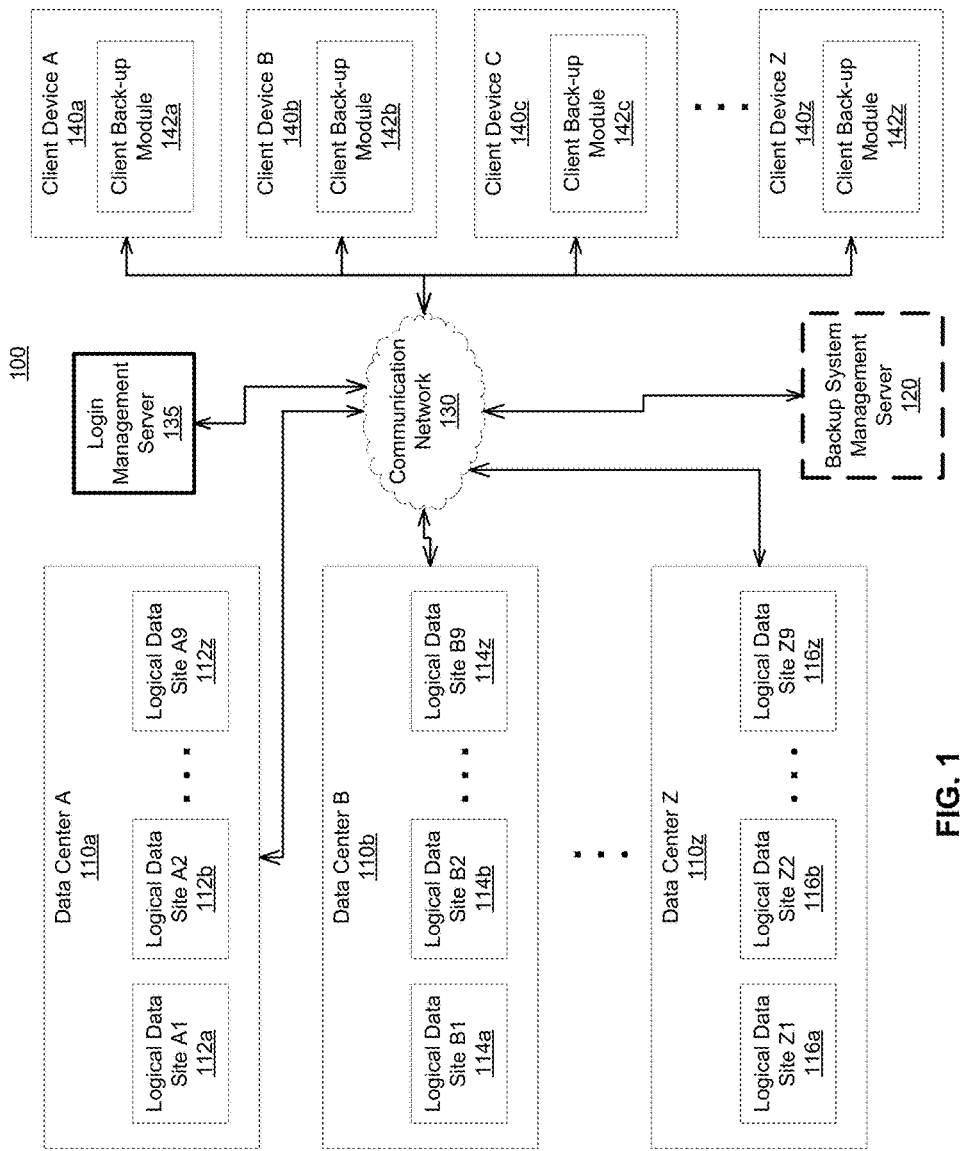
FIG. 1 is a block diagram illustrating an exemplary system for backing up data, according to one embodiment of the present invention.

FIG. 1 illustrates an exemplary system 100 for backup, restoration, and access of user data (e.g., one or more document files, one or more audio files, etc.) between client devices A 140a, B 140b, C 140c through Z 140z (e.g., personal computer, server computing system, personal digital assistant, mobile phone, music player, etc.) and data centers A 110a, B 110b through Z 110z (e.g., server systems with a plurality of data storage devices, server systems connected to a plurality of network data storage devices, etc.). The system 100 includes a communication network 130 (e.g., internet protocol (IP) network, a local area network (LAN), internet, etc.), a backup system management server 120, and a login management server 135.

Each data center A 110a, B 110b through Z 110z includes a plurality of logical data sites 1, 2 through 9, 112a, 112b through 112z, 114a, 114b through 114z, and 116a, 116b through 116z, respectively. Each client device A 140a, B 140b, C 140c through Z 140z includes a client backup module 142a, 142b, 142c through 142z, respectively. The data centers 110a-110z, the client devices 140a-140z, and/or the backup system management server 120 communicate via the communication network 130.

The backup system management server 120 is configured to manage the backup of user data across the various data centers 110a-110z. In one embodiment, the backup system management server 120 manages transfer of data between data centers. The backup system management server 120 is configured to manage the restoration of user data from one or more of the logical data sites at one or more of the data centers 110a-110z to the client devices 140a-140z. The backup system management server 120 is configured to communicate with the client backup module 142a-142z on each client device 140a-140z to manage the backup and/or restoration of the user data (e.g., pause backup, start backup, select backup set, start restoration, schedule backup, communicate a backup policy, update a backup set, etc.).

The login management server 135 processes requests for remote data access from a user interface (e.g., a web browser, mobile phone application interface). The login management server 135 is further illustrated in FIGS. 8 and 13A-13B, according exemplary embodiments.

In some embodiments, the restoration of the user data is to the originating client device (e.g., the client device from which the user data originated from, the client device connected to the computing device from which the user data originated from, etc.). In other embodiments, the restoration of the user data is to another client device that is not the originating client device (e.g., new user computer, etc.). Backed-up data may be remotely accessed from a client device via a user interface such as a web browser or a mobile phone application user interface. Backed-up data includes directory listings, backed-up files, and backup status files associated with the backed-up files.

In other embodiments, each data center 110a-110z includes a data center management server (shown in FIG. 2) for managing the backup and/or the restoration of the user data. In some embodiments, each logical site includes a site management server for managing the backup and/or the restoration of the user data. In other embodiments, the backup system management server 120 manages the backup and/or the restoration of the user data by managing one or more of the data center management servers and/or one or more of the site management servers.

Although FIG. 1 illustrates a single communication network 130, the system 100 is configured to include a plurality of communication networks and/or the plurality of communication networks are configured in a plurality of ways (e.g., a plurality of interconnected local area networks (LAN), a plurality of interconnected wide area networks (WAN), a plurality of interconnected LANs and/or WANs, etc.).

Although FIG. 1 illustrates the data centers A 110a, B 110b through Z 110z, the logical data sites 1, 2 through 9 (e.g., 112a-112z) and the client device A 140a, B 140b, C 140c through Z 140z, the system 100 is configured to include any number of data centers, logical data sites, and/or client devices. In some embodiments, data centers A, B, and C include ten logical data sites and data centers D, E, F, and G include twenty logical data sites. In other embodiments, ten thousand client devices are associated with each logical data site. In this example, data center G is associated with two hundred thousand client devices since data center G includes twenty logical data sites and each logical data site is associated with ten thousand client devices.

Figure 2:
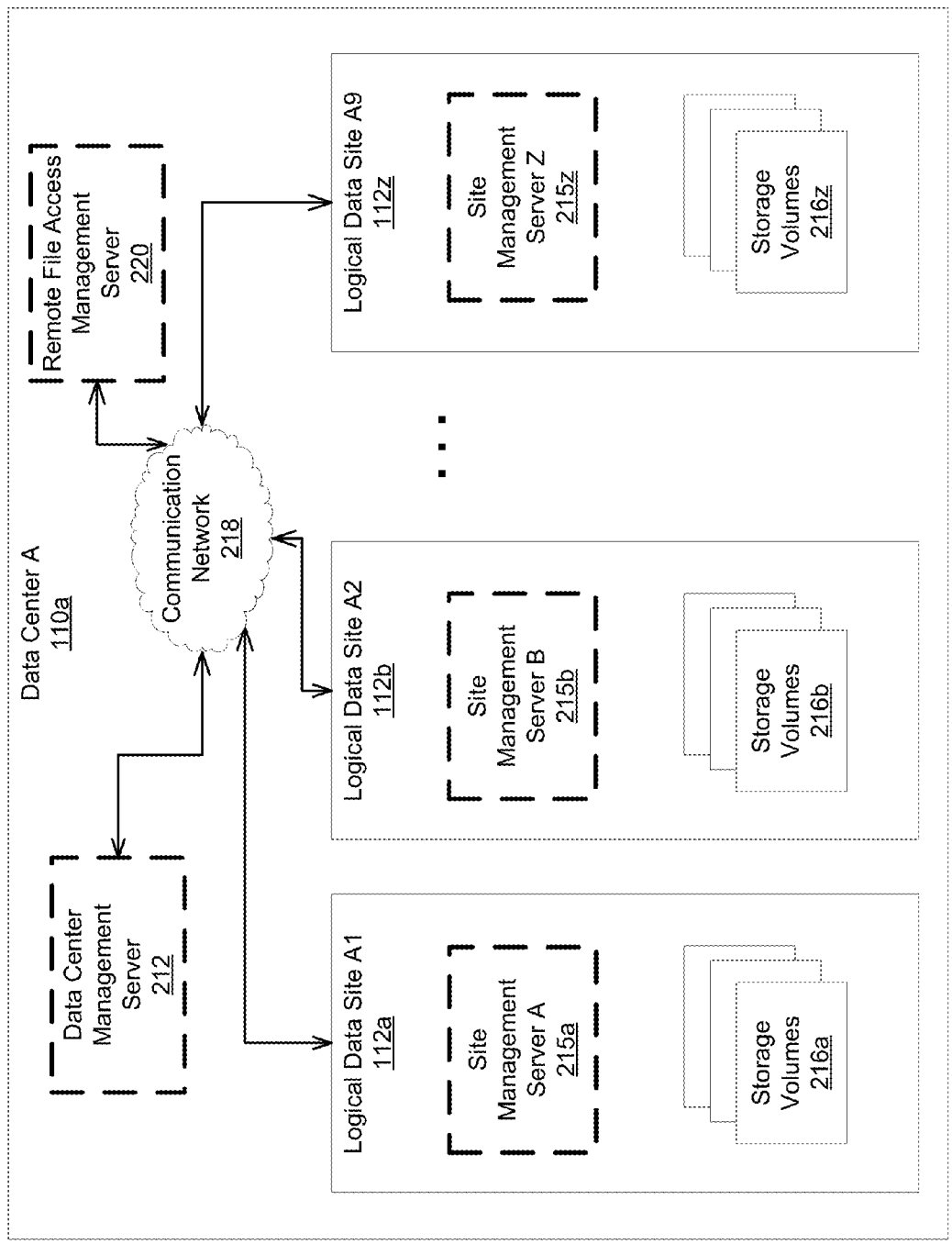
FIG. 2 is a block diagram illustrating an exemplary data center, according to one embodiment of the present invention.

FIG. 2 illustrates an exemplary data center A 110a. The data center A 110a includes a data center management server 212, a remote file access management server 220, logical data sites A 112a, B 112b through Z 112z, and a communication network 218. Each logical data site A 112a, B 112b through Z 112z includes a site management server A 215a, B 215b through Z 215z and one or more storage volumes 216a, 216b through 216z (e.g., logical storage volumes, storage devices, distributed storage devices, etc.). The data center management server 212 and/or the site management servers 215a, 215b through 215z is configured to manage the plurality of logical data sites 112a-112z.

Each logical data site A 112a, B 112b through Z 112z is configured to store and/or retrieve the backup of user data associated with a plurality of users (e.g., subscribers to a backup subscription service, users in a corporate network, etc.). The storage volumes 216a-216z at each logical data site 112a-112z is configured to store the backup of the user data.

In some embodiments, the backup of the user data (e.g., data backup from a single computing device associated with a single user) is stored on a single storage volume (e.g., single storage device, single logical storage volume, redundant array of inexpensive disks (RAID) storage device, etc.). In other embodiments, the backup of the user data is stored on one or more storage volumes (e.g., distributed backup among a plurality of storage devices, redundant backup among a plurality of logical storage volumes, redundant backup among a plurality of RAID storage devices, etc.). In other embodiments, the backup of user data is stored in one data center. In other embodiments, the backup of user data is stored in multiple data centers. In the embodiments where a user backs up data from multiple client devices, the backed-up data from each client device may be stored in one or more data centers.

In some embodiments, the data center management server 212 manages the backup and/or the restoration for the data center A 110a, while the site management server manages the storage and/or retrieval at the corresponding logical data site. In one embodiment, the data center management server 212 manages transfer of data between logical data sites 112a, 112b, through 112z. The remote file access management server 220 manages remote access, requested from one or more user interfaces (e.g., web browser, mobile phone application such as an iPhone application), to backed-up data stored in storage volumes 216a, 216b through 216z. In some embodiments, each logic data site A1, A2 through A9 may include a remote file access management server 220 for processing remote access requests to backed-up data stored in respective storage volumes. In other embodiments, the site management servers A 215a, B 215b through Z 215z process remote data access requests to their respective storage volumes 216a, 216b through 216z.

Although FIG. 2 illustrates a data center A 110a with the logical data sites A 112a, B 112b through Z 112z, the data center A 110a may include a single logical data site or any number of logical data sites (e.g., twenty, forty, one hundred, etc.). Although FIG. 2 illustrates the data center management server 212 and/or the site management server, the storage and/or retrieval of the backups of user data may be managed individually by either the data center management server 212 or the site management server at each corresponding logical site. Although FIG. 2 illustrates the remote file access management server 220, the management of remote access to backed-up data may be managed individually by either the data center management server 212 or the site management server at each corresponding logical site.

Figure 3A:
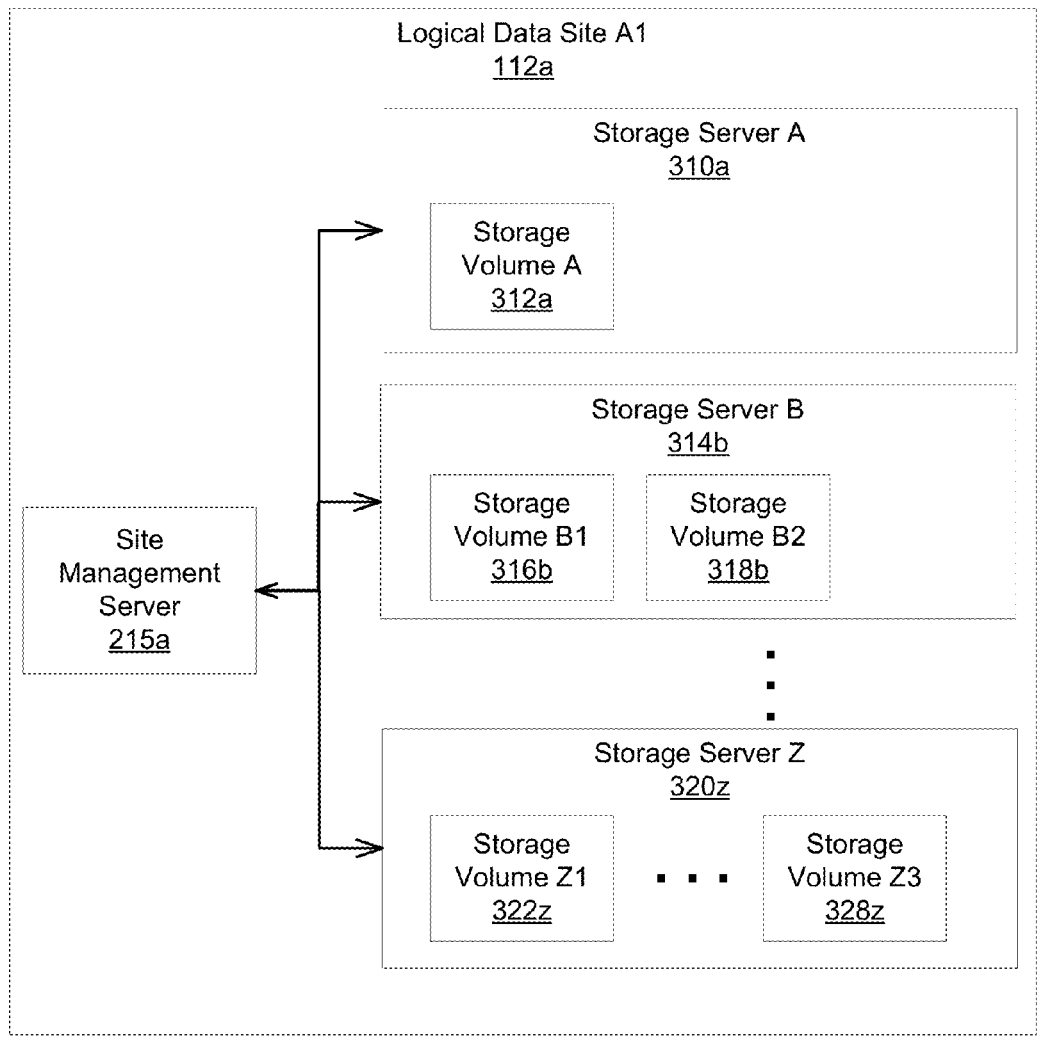
FIGS. 3A-3B are block diagrams illustrating exemplary logical data sites, according to one embodiment of the present invention.

FIG. 3A illustrates the logical data site A 112a, according to one embodiment. The logical data site A 112a includes a site management server 215a and storage servers A 310a, B 314b through Z 320z. The storage server A 310a includes a storage volume A 312a. The storage server B 314b includes a storage volume B1 316b and a storage volume B2 318b. The storage server Z 320z includes storage volumes Z1 322z through Z3 328z. Each storage volume includes a plurality of user data backup (not shown) associated with various users. The site management server 215a is configured to communicate with the storage servers A 310a, B 314b through Z 320z to backup and/or restore the backup of the user data.

Although FIG. 3A illustrates storage servers A 310a, B 314b through Z 320z and storage volumes A 312a, B1 316b, B2 318b, Z1 322z through Z3 328z, the logical data site A 112a may include any number of storage servers and/or storage volumes. For example, the logical data site A 112a may include four storage servers and each storage server includes forty storage volumes.

Figure 8:
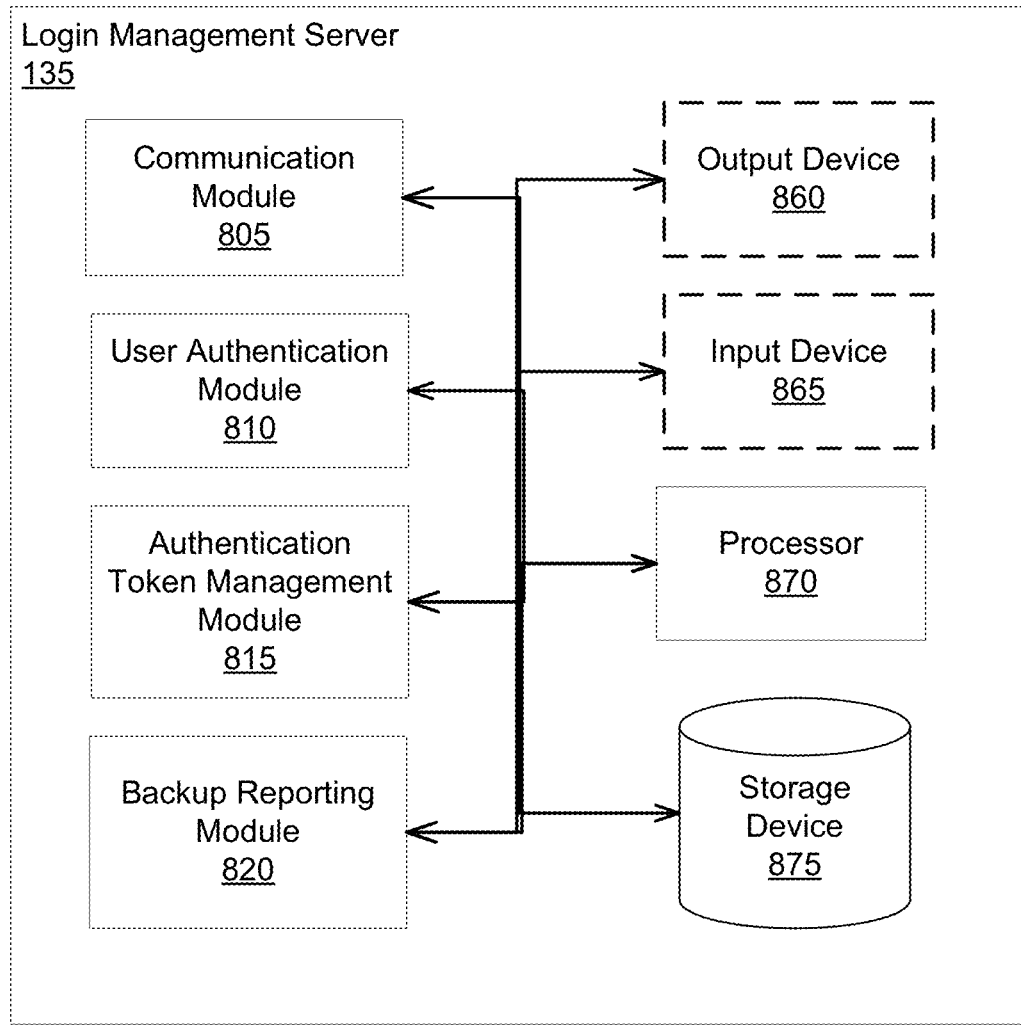
FIG. 8 is a block diagram illustrating an exemplary login management server, according to one embodiment of the present invention.

In some embodiments, the site management server 215a is configured to include a database server and a server managing storage bandwidth resources for the logical data site A1 112a. In these embodiments, the site management server 215a is configured to control one or more communications servers that act as intermediary between client communication module 805 (as illustrated in FIG. 8 and discussed in more detail below) and the storage servers A 310a, B 314b through Z 320z.

Figure 3B:
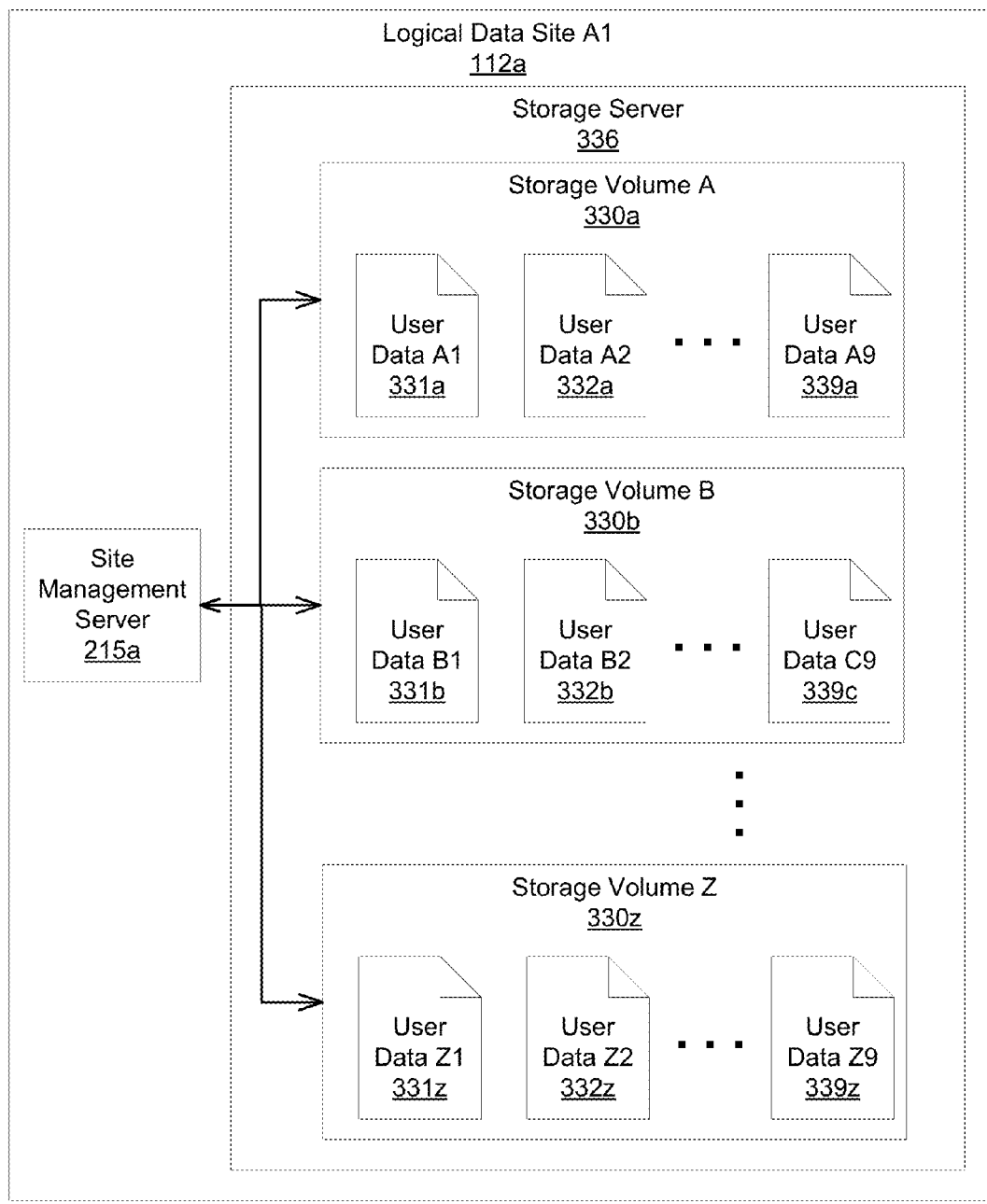

FIG. 3B illustrates the logical data site A1 112a, according to one embodiment. The logical data site A1 112a includes the site management server 215a and a single storage server 336. The storage server 336 includes storage volumes A 330a, B 330b through Z 330z. Each storage volume A 330a, B 330b through Z 330z includes plurality of user data 1, 2 through 9 (e.g., the user data is the backup of the user data stored on a client device associated with the user). The site management server 215a is configured to communicate with the storage server 336 and/or the storage volumes A 330a, B 330b through Z 330z to backup and/or restore the backup of the user data.

In some embodiments, the site management server 215a is configured to communicate with the storage volumes to transfer user data between the storage volumes. In some embodiments, the site management server 215a is configured to communicate with one or more site management servers (not shown) at one or more other logical data sites (not shown) to transfer user data between the logical data sites.

Although FIG. 3B illustrates storage volumes A 330a, B 330b through Z 330z and user data 1, 2 through 9, the logical data site A1 112a is configured to include any number of storage volumes and/or user data. For example, the logical data site A1 112a is configured to include twenty storage volumes and each storage volume includes user data associated with one thousand users.

Figure 4:
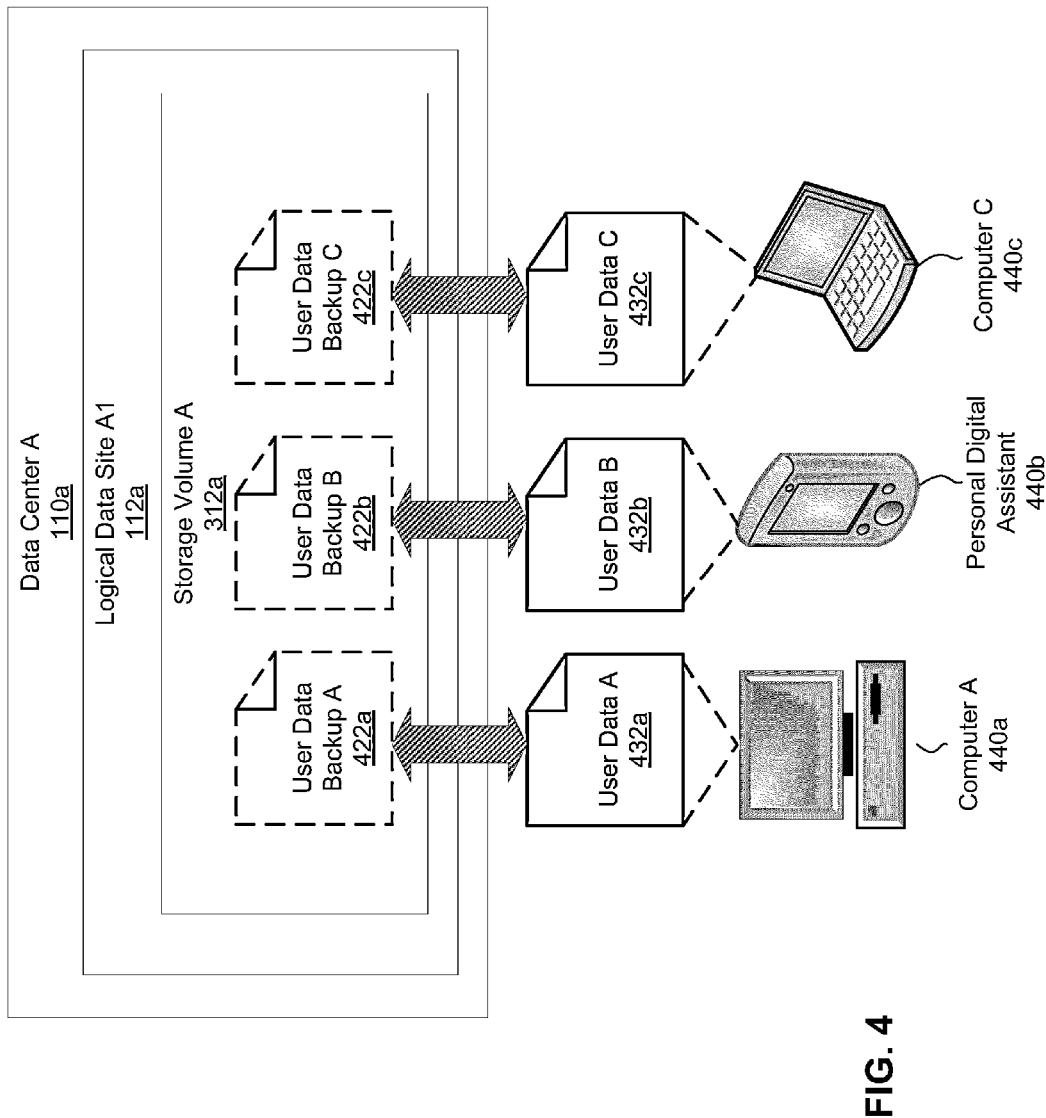
FIG. 4 is a block diagram illustrating an exemplary data center storing data backed-up from client devices, according to one embodiment of the present invention.

FIG. 4 illustrates the exemplary data center 110a for the backup of user data from one or more client devices 440a, 440b, and 440c. The data center 110a includes the logical data site A1 112a. The logical data site A1 112a is shown to include the storage volume A 312a, according to one exemplary embodiment. The storage volume A 312a includes user data backups A 422a, B 422b, and C 422c. The user data backups A 422a, B 422b, and C 422c correspond to user data A 432a, B 432b, and C 432c, respectively. The user data A 432a, B 432b, and C 432c are stored on the client devices, computer A 440a, personal digital assistant 440b, and computer C 440c, respectively. As illustrated in FIG. 4, the user data A 432a, B 432b, and C 432c stored on the client devices is backed-up to the storage volume A 312a on the logical data site A1 112a in the data center A 110a. User data associated with a particular client device may be stored on multiple storage volumes of a single or multiple logical data sites.

Figure 5:
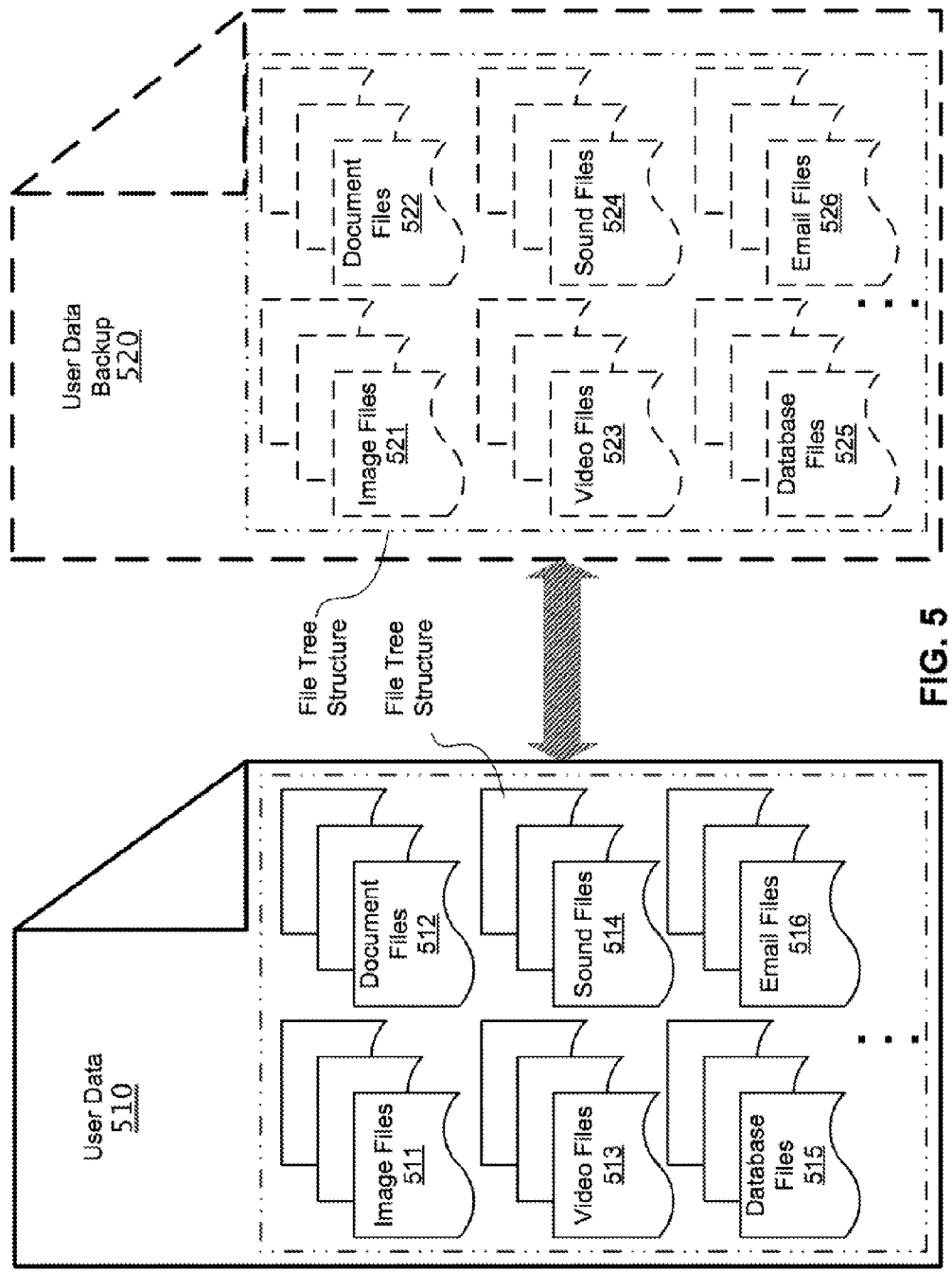
FIG. 5 illustrates exemplary user data and user data backup, according to one embodiment of the present invention.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and email files 526, and/or other information that is selected for backup by the user, automatically by the management server (e.g., site management server, data center management server, etc.), and/or based on backup templates and/or backup policies. The technology as described herein is utilized to backup the user data as the user data backup.

Although FIG. 5 illustrates certain types of files (e.g., image files, document files, etc.), the technology as described herein may backup any type of information and/or data stored on the client device and/or a storage device connected to the client device (e.g., external storage device, network connected storage device, etc.).

Figure 6:
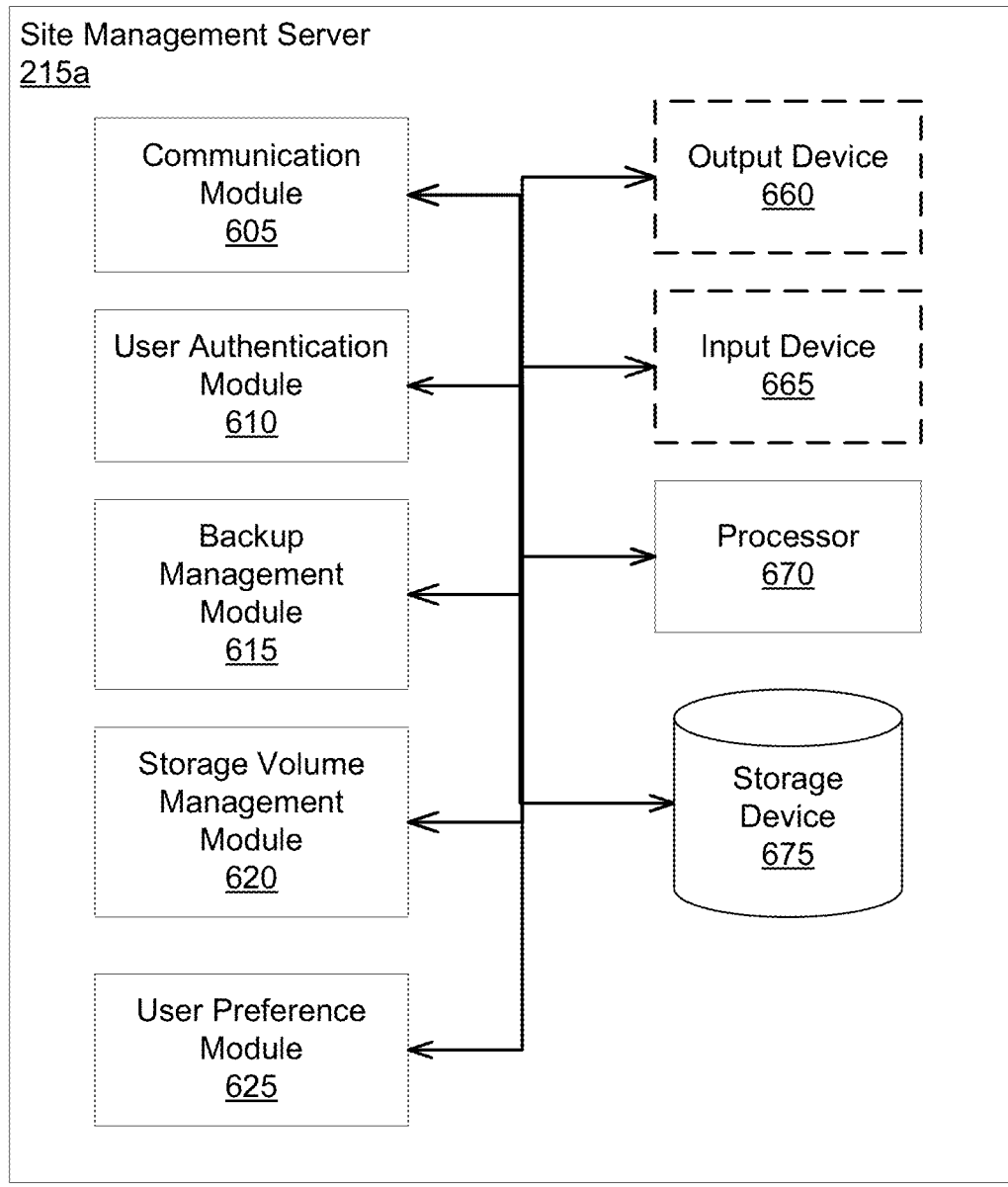
FIG. 6 is a block diagram illustrating an exemplary site management server, according to one embodiment of the present invention.

FIG. 6 illustrates an exemplary site management server 215a. The site management server 215a includes a communication module 605, a user authentication module 610, a backup management module 615, a storage volume management module 620, a user preference module 625, an output device 660, an input device 665, a processor 670, and a storage device 675. The modules and/or devices include hardware and/or software. The modules and/or devices illustrated in the site management server 215a is configured to, for example, utilize the processor to execute computer executable instructions and/or include a processor to execute computer executable instructions (e.g., an encryption processing unit, a field programmable gate array processing unit, etc.). It should be understood that the site management server 215a is configured to include, for example, other modules, devices, and/or processors known in the art and/or varieties of the illustrated modules, devices, and/or processors. It should be understood that the modules and/or devices illustrated in the site management server 215a is configured to be located within the site management server 215a and/or connected to the site management server 215a (e.g., directly, indirectly, etc.), but outside of the physical components of the management server 215a (e.g., personal computer, mobile device, etc.).

The communication module 605 communicates data to/from the site management server 215a. The communication module 605 may utilize one or more communication interfaces. The user authentication module 610 authenticates users to the site management server 215a. The backup management module 615 manages and/or controls backups to/from the site management server 215a. The storage volume management module 620 manages user data stored on a storages volume, a logical data site and/or data center.

The output device 660 outputs information and/or data associated with the site management server 215a (e.g., information to a printer (not shown), information to a speaker, etc.). The input device 665 receives information associated with the site management server 215a (e.g., instructions from a user, instructions from a computing device, etc.) from a user (not shown) and/or a computing system (not shown). The input device 665 is configured to include, for example, a keyboard, a scanner, etc.

The processor 670 executes the operating system and/or any other computer executable instructions for the site management server 215a (e.g., executes applications, etc.). The site management server 215a is configured to include random access memory (not shown). The random access memory temporarily stores the operating system, the instructions, and/or any other data associated with the site management server 215a. The random access memory includes one or more levels of memory storage (e.g., processor register, storage disk cache, main memory, etc.).

The storage device 675 stores the files, user preferences, backup sets (i.e., groupings of files according to pre-defined criteria), access information, an operating system and/or any other data associated with the site management server 215*a*. The storage device 675 is configured to include a plurality of storage devices. The storage device 675 is configured to include, for example, long-term storage (e.g., a hard drive, a tape storage device, flash memory, etc.), short-term storage (e.g., a random access memory, a graphics memory, etc.), and/or any other type of computer readable storage.

Although FIG. 6 illustrates the exemplary site management server 215*a*, any of the management servers described herein (e.g., data center management server) are configured to include the components and functionality described with respect to the site management server 215*a*. In some embodiments, a storage server (e.g., 336) is configured to include the storage volume management module 620. The storage server is configured to include a data access module, a lock management module, a backend scavenger module, and/or a file check module. The data access module may access data stored on the storage server. The storage volume management module may manage user data stored on a storage volume, a logical data site and/or data center. The lock management module manages locks for locking user data during transfer of user data, maintenance, etc. The backend scavenger module may delete files no longer required by client for backup. In some embodiments, the client device determines when to purge unwanted files, and updates the backup status files accordingly. The backend scavenger module may purge data for expired computers, delete obsolete backup files, request resend of missing files, perform server file integrity checks, aggregate client log files, gather server file statistics to logs and database, and/or manage free space in the file system (e.g., NTFS, proprietary file system). The file check module may delete invalid files (e.g., expired files, suspended files, etc.), verify integrity of server files, gather computer parameters from database, records activity to logs and database, and/or read storage volume configurations from database, etc.

Figure 7:
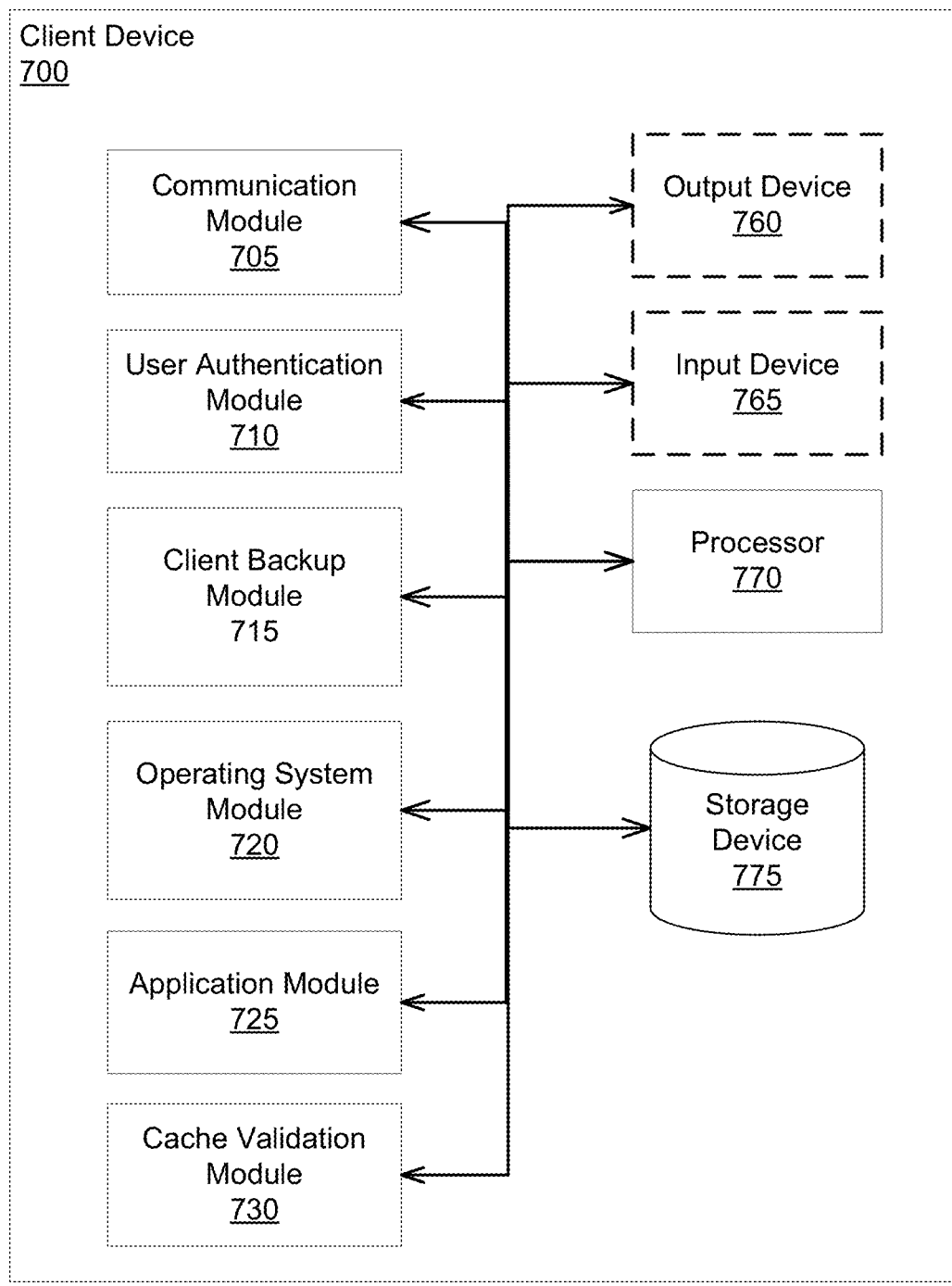
FIG. 7 is a block diagram illustrating an exemplary client device, according to one embodiment of the present invention.

FIG. 7 illustrates an exemplary client device 700. The client device 700 includes a communication module 705, a user authentication module 710, a client backup module 715, an operating system module 720, an application module 725, a cache validation module 730, an output device 760, an input device 765, a processor 770, and a storage device 775. The modules and/or devices include hardware and/or software. The modules and/or devices illustrated in the client device 700 are configured to, for example, utilize the processor 770 to execute computer executable instructions and/or include a processor to execute computer executable instructions (e.g., an encryption processing unit, a field programmable gate array processing unit, etc.). It should be understood that the client device 700 is configured to include, for example, other modules, devices, and/or processors known in the art and/or varieties of the illustrated modules, devices, and/or processors. It should be understood that the modules and/or devices illustrated in the client device 700 are located within the client device 700 and/or connected to the client device (e.g., directly, indirectly, etc.), but outside of the physical components of the client device 700 (e.g., personal computer, mobile device, etc.).

The communication module 705 communicates data and/or information to/from the client device 700. The user authentication module 710 authenticates users for the client device 700 and/or the client backup module 715. The client backup module 715 backs-up, restores and/or identifies user data for backup and restoration. The operating system module 720 operates an operating system on the client device 700. The application module 725 operates one or more applications on the client device 700. The cache validation module 730 maintains and validates client cache storing backed-up data. The client cache is stored in the storage device 775. In one embodiment, the cache validation module 730 asynchronously validates the client cache, thereby improving user experience related to remotely accessing backed-up data.

The output device 760 outputs information and/or data associated with the client device 700 (e.g., information to a printer (not shown), information to a speaker, etc.). The input device 765 receives information associated with the client device 700 (e.g., instructions from a user, instructions from a computing device, etc.) from a user (not shown) and/or a computing system (not shown). The input device 765 is configured to include, for example, a keyboard, a scanner, an enrollment device, a scale, etc.

The processor 770 executes the operating system and/or any other computer executable instructions for the client device (e.g., executes applications, etc.). The client device 700 is configured to include random access memory (not shown). The random access memory temporarily stores the operating system, the instructions, and/or any other data associated with the client device. The random access memory is configured to include one or more levels of memory storage (e.g., processor register, storage disk cache, main memory, etc.).

The storage device 775 stores the files, user preferences, backup status files (e.g., a separate backup status file for each backed-up file), access information, an operating system and/or any other data associated with the management server (e.g., site management server, data center management server, etc.). The storage device 775 includes a plurality of storage devices. The storage device 775 is configured to include, for example, long-term storage (e.g., a hard drive, a tape storage device, flash memory, etc.), short-term storage (e.g., a random access memory, a graphics memory, etc.), and/or any other type of computer readable storage.

FIG. 8 illustrates the login management server 135, according to an exemplary embodiment. The login management server 135 includes a communication module 805, a user authentication module 810, an authentication token management module 815, a backup reporting module 820, an output device 860, an input device 865, a processor 870, and a storage device 875. The modules and/or devices include hardware and/or software. The modules and/or devices illustrated in the login management server 135 are configured to utilize the processor 870 to execute computer executable instructions and/or include a processor to execute computer executable instructions (e.g., an encryption processing unit, a field programmable gate array processing unit, etc.). It should be understood that the login management server 135 is configured to include, for example, other modules, devices, and/or processors known in the art and/or varieties of the illustrated modules, devices, and/or processors. It should be understood that the modules and/or devices illustrated in the login management server 135 are configured to be located within the login management server 135 and/or connected to the login management server 135 (e.g., directly, indirectly, etc.), but outside of the physical components of the login management server 135 (e.g., personal computer, mobile device, etc.).

The communication module 805 communicates data to/from the login management server 135. The user authentication module 810 authenticates users to the login management server 135. For example, the user authentication module 810 may authenticate users based on user login name, password, pass code, and/or any other user credentials. The authentication token management module 815 manages and/or generates authentication tokens. In some embodiments, the authentication token management module 815 issues expiring authentication tokens which are stored in the storage device 875 (e.g., an accounts database). The generated authentication tokens are passed on to a remote file access management server, advantageously enhancing security of remotely accessing the backed-up data. The backup reporting module 820 retrieves and reports to the user interface information regarding backed-up data. For example, the backup reporting module 820 retrieves a list of backed-up client devices associated with the user.

The output device 860 outputs information and/or data associated with the login management server 135 (e.g., information to a printer (not shown), information to a speaker, etc.). The input device 865 receives information associated with the login management server 135 (e.g., instructions from a user, instructions from a computing device, etc.) from a user (not shown) and/or a computing system (not shown). The input device 865 is configured to include, for example, a keyboard, a scanner, etc.

The processor 870 executes the operating system and/or any other computer executable instructions for the login management server 135 (e.g., executes applications, etc.). The login management server 135 is configured to include random access memory (not shown). The random access memory temporarily stores the operating system, the instructions, and/or any other data associated with the login management server 135. The random access memory includes one or more levels of memory storage (e.g., processor register, storage disk cache, main memory, etc.).

The storage device 875 stores the files, user preferences, access information, user accounts information, an operating system and/or any other data associated with the login management server 135. The user accounts information includes a list of computing devices from which user data is backed-up, information associated with authentication tokens managed by the authentication token management module 815, and etc. In other embodiments, the user accounts information is stored in the backup system management server 120 or another server (e.g., the data center management server 212, the remote file access management server 220, etc.). The storage device 875 includes a plurality of storage devices. The storage device 875 is configured to include, for example, long-term storage (e.g., a hard drive, a tape storage device, flash memory, etc.), short-term storage (e.g., a random access memory, a graphics memory, etc.), and/or any other type of computer readable storage.

In some embodiments, the login management server 135 is implemented as an ASP.NET application. In other embodiments, the login management server 135 is implemented as any web server application using any technology (e.g., Apache). In some embodiments, the user authentication module 810 ensures privacy by utilizing the hypertext transfer protocol secure ("HTTPS").

Although FIG. 8 illustrates the exemplary login management server 135, any of the management servers described herein (e.g., the site management server 215a, the remote file access management server 220) are configured to include the components and functionality described with respect to the login management server 135.

Figure 9:
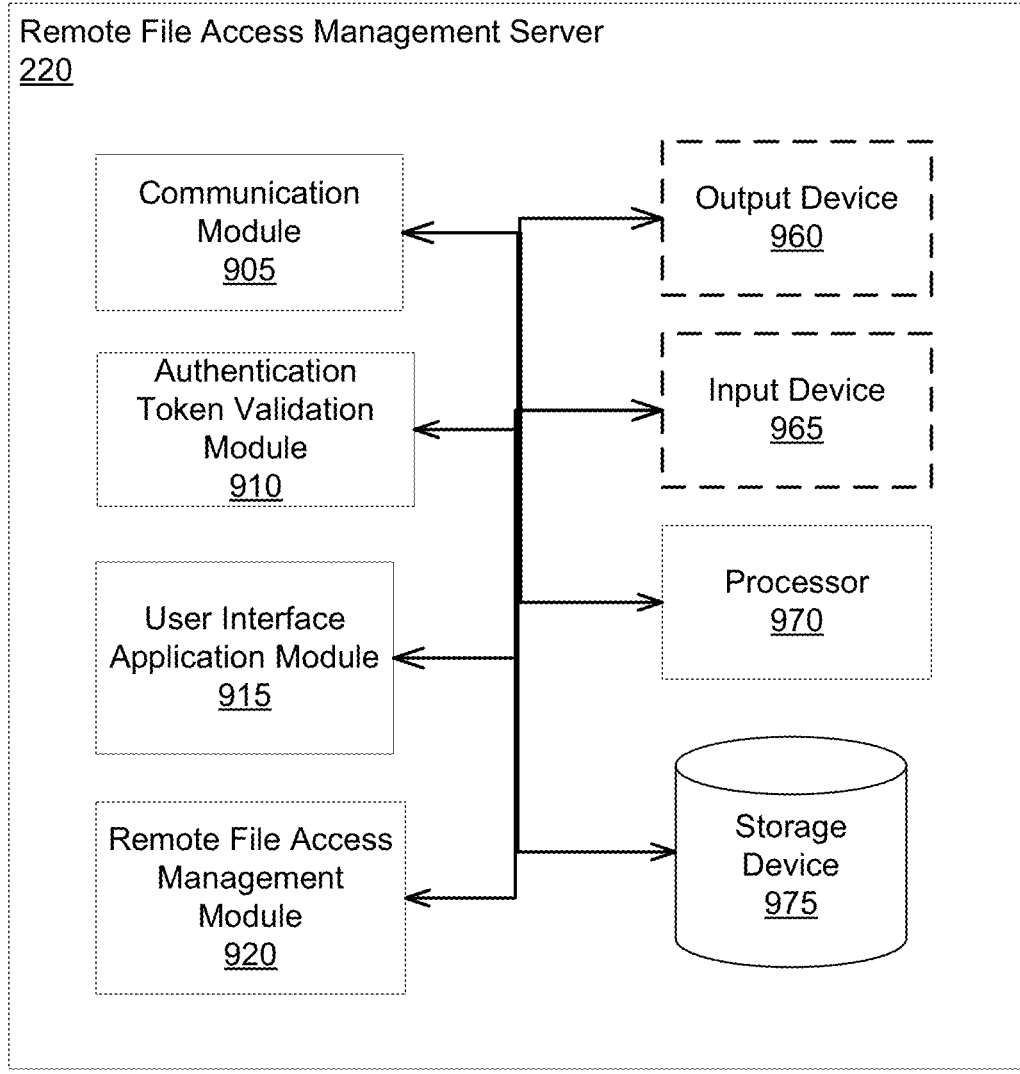
FIG. 9 is a block diagram illustrating an exemplary remote file access management server, according to one embodiment of the present invention.

FIG. 9 illustrates an exemplary remote file access management server 220. The remote file access management server 220 is shown to include a communication module 905, an authentication token validation module 910, a user interface application module 915, a remote file access management module 920, an output device 960, an input device 965, a processor 970, and a storage device 975. The modules and/or devices include hardware and/or software. The modules and/or devices illustrated in the remote file access management server 220 are configured to utilize the processor 970 to execute computer executable instructions and/or include a processor to execute computer executable instructions (e.g., an encryption processing unit, a field programmable gate array processing unit, etc.). It should be understood that the remote file access management server 220 is configured to include, for example, other modules, devices, and/or processors known in the art and/or varieties of the illustrated modules, devices, and/or processors. It should be understood that the modules and/or devices illustrated in the remote file access management server 220 are configured to be located within the remote file access management server 220 and/or connected to the remote file access management server 220 (e.g., directly, indirectly, etc.), but outside of the physical components of the remote file access management server 220 (e.g., personal computer, mobile device, etc.).

The communication module 905 communicates data to/from the remote file access management server 220. The communication module 905 may include one or more communication interfaces facilitating communication to/from the remote file access management server 220. The authentication token validation module 910 manages and validates authentication tokens issued by the login management server 135. The user interface application module 915 manages downloading and streaming backed-up files to user. The remote file access management module 920 manages and/or controls access and retrieval of backed-up files and folders from storage.

The output device 960 outputs information and/or data associated with the remote file access management server 220 (e.g., information to a printer (not shown), information to a speaker, etc.). The input device 965 receives information associated with the remote file access management server 220 (e.g., instructions from a user, instructions from a computing device, etc.) from a user (not shown) and/or a computing system (not shown). The input device 965 is configured to include, for example, a keyboard, a scanner, an enrollment device, a scale, etc.

The processor 970 executes the operating system and/or any other computer executable instructions for the remote file access management server 220 (e.g., executes applications, etc.). The remote file access management server 220 includes random access memory (not shown). The random access memory temporarily stores the operating system, the instructions, and/or any other data associated with the remote file access management server. The random access memory includes one or more levels of memory storage (e.g., processor register, storage disk cache, main memory, etc.).

The storage device 975 stores the files, user preferences, access information, user authentication information, backup status files, an operating system and/or any other data associated with the remote file access management 220. The storage device 975 includes a plurality of storage devices. The storage device 975 is configured to include, for example, long-term storage (e.g., a hard drive, a tape storage device, flash memory, etc.), short-term storage (e.g., a random access memory, a graphics memory, etc.), and/or any other type of computer readable storage.

Although FIG. 9 illustrates the exemplary remote file access management server 220, any of the management servers described herein (e.g., site management server 215a, the login management server 135) are configured to include the components and functionality described with respect to the remote file access management server 220.

Figure 10:
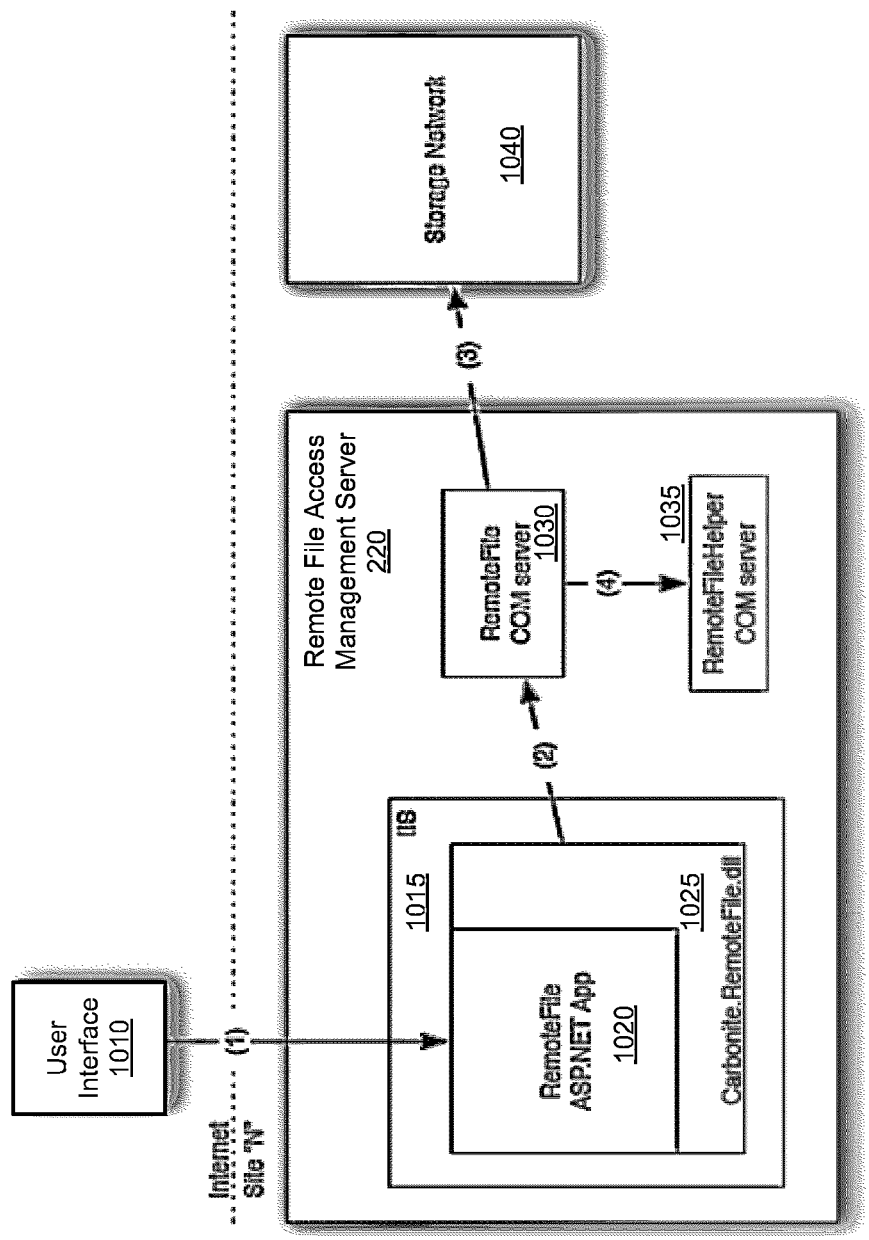
FIG. 10 is a block diagram illustrating an exemplary implementation of an exemplary remote file access management server, according to one embodiment of the present invention.

FIG. 10 illustrates an exemplary implementation of the remote file access management server 220 servicing file access requests from a user interface 1010 (e.g., a web browser). A similar implementation of the remote file access management server 220 is contemplated for remote access requests received from other types of user interfaces (e.g., mobile phone application user interfaces). The remote file access management server 220 processes user requests including directory listing requests and file access requests by accessing requested backed-up data stored in a storage network 1040. The storage network 1040 is contemplated to correspond to the data centers storing backed-up data (e.g., data centers A 110a, B 110b through Z 110z). In other embodiments, instead of the remote file access management server, the site management servers (e.g., A 215a, B 215b through Z 215z) are implemented as illustrated in FIG. 10 to process remote data access requests received from various user interfaces.

As illustrated, the remote file access management server 220 includes an Internet Information Services ("IIS") web server 1015, and two Component Objected Model ("COM") servers 1030 and 1035. The IIS web server 1015 includes a remote file ASP.NET application 1020 and a RemoteFile.dll 1025. The two COM services include a remote file access COM server 1030 and a remote file helper COM server 1035. Accordingly, the remote file access management server 220 is configured to provide high-bandwidth access to the storage network 1040 for the logical data sites at the data center. In other embodiments, the remote file access management server 220 includes a single COM server for accessing the storage network 1040.

Upon receiving web requests from the user interface 1010, the remote file ASP.NET application 1020 converts these web requests into one or more calls into the RemoteFile.dll client library 1025, which in turn makes a call (e.g., remote procedure call) to the remote file COM server 1030. In some embodiments, the remote file COM server 1030 downloads backup status files associated with the client device 700 from the storage network 1040 and accesses their contents using the Remote File Helper COM server 1035. The remote file COM server 1030 saves the downloaded backup status files into a disk cache on the remote file access management server 220 for faster processing. The remote file helper COM server 1035 is configured to open the backup status files from the disk cache, memory map the backup status files, and build indexes for faster processing of requests. In some embodiments, the remote file helper COM server 1035 is configured to use the generated indexes to look up and return requested directory listings, including files and file metadata.

Figure 18:
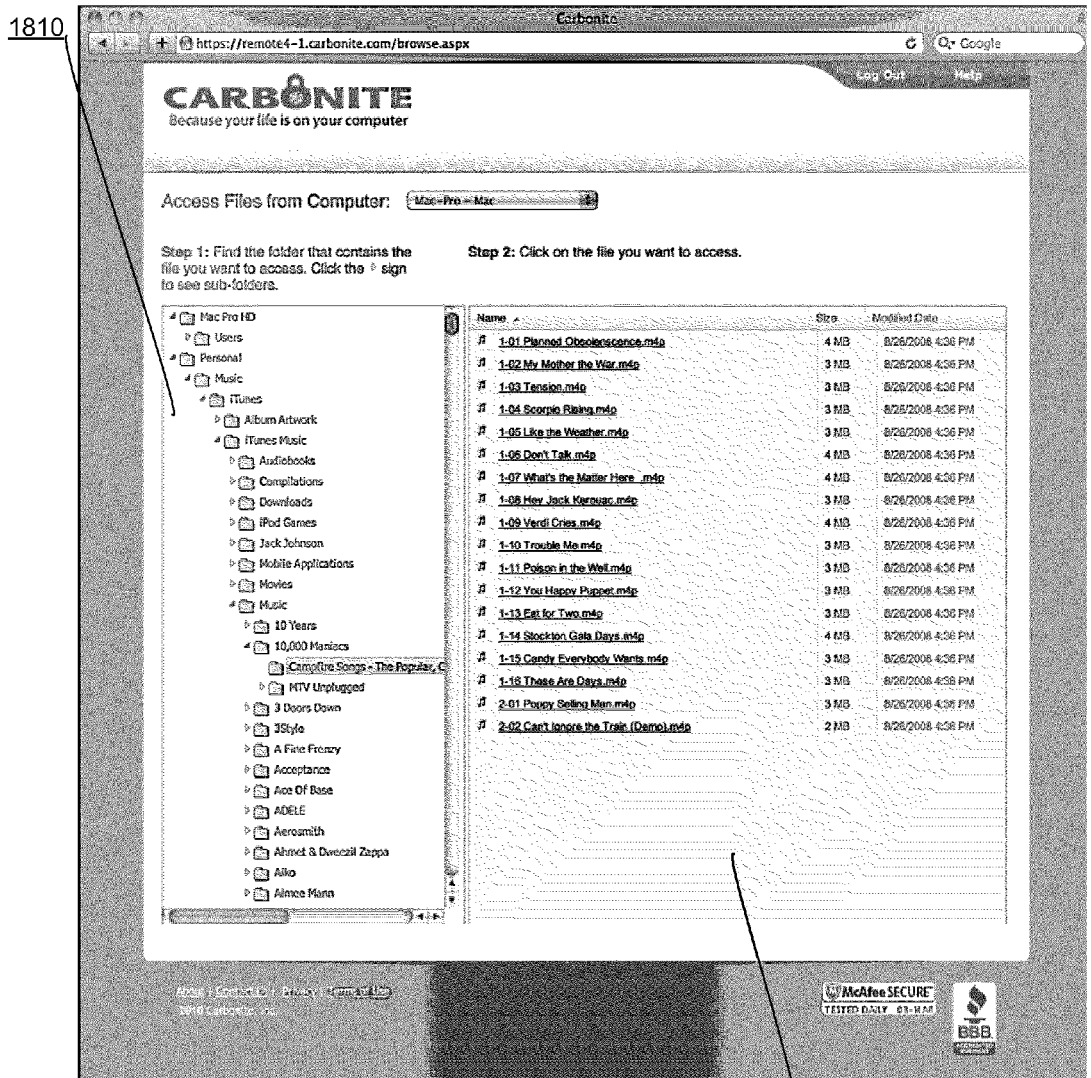
FIG. 18 illustrates another exemplary web browser user interface facilitating remote data access, according to one exemplary embodiment.

The user interface 1010 may send the authentication token received from the login management server 135 in a query string to the remote file ASP.NET application 1020. In some embodiments, the Remote File COM server 1030 reads the authentication token from the query string and stores it into a session cookie. The remote file ASP.NET application 1020 advantageously removes the query string from the Uniform Resource Locator ("URL") and re-directs the user interface 1010 to the same page, thereby preventing the user interface 1010 from recording the authentication token in the browsing history. As illustrated in FIG. 18, the query string including an authentication token is not included in the URL shown to the user.

When the user requests access to a file, the user interface 1010 sends a request to the remote file access management server 220. The RemoteFile.dll 1025 is configured to handle the request on behalf of the remote file ASP.NET application 1020 by parsing file identification (e.g., file id) and the authentication token included in the request, and requesting directory entry information from the remote file COM server 1030 for the file requested by the user.

Using the directory entry information, the RemoteFile.dll 1025 validates the file. For example, the RemoteFile.dll 1025 may check whether the file exists, whether the file is a directory, and/or whether the file is already in the client cache. In some embodiments, the RemoteFile.dll 1025 requests the exact length of the requested file from the remote file COM server 1030. Using the remote file helper COM server 1035, the remote file COM server 1030 extracts a file map from the cached backup status files. In some embodiments, the file map provides file sizes and/or bit ranges of the backed-up file segments, stored on the storage network 1040, corresponding to the requested file. To compute the length of the selected file, the remote file COM server 1030 downloads, decrypts and decodes the files comprising the selected file. In some embodiments, the decrypted files are discarded and the computed file length is returned to the RemoteFile.dll 1025. Using the exact file length, the RemoteFile.dll 1025 may parse a series of one or more byte ranges from the request, and using the remote file COM server 1030, read the bytes in chunks, and stream the file to the client (i.e., the user interface 1010) in chunks, advantageously reducing memory consumption during the download. In some embodiments, the authentication token is confirmed on each access to the remote file COM server 1030.

Although FIG. 10, illustrates the remote file access management server 220 including two COM servers 1030 and 1035 and the ASP.NET application 1020, satisfying remote file access requests from the user as described herein may be implemented using other technologies (e.g., UNIX applications, Apache, .NET, etc.). In other embodiments, a single server may include functionality described with respect to the remote file COM server 1030 and the remote file helper COM server 1035.

Figure 11:
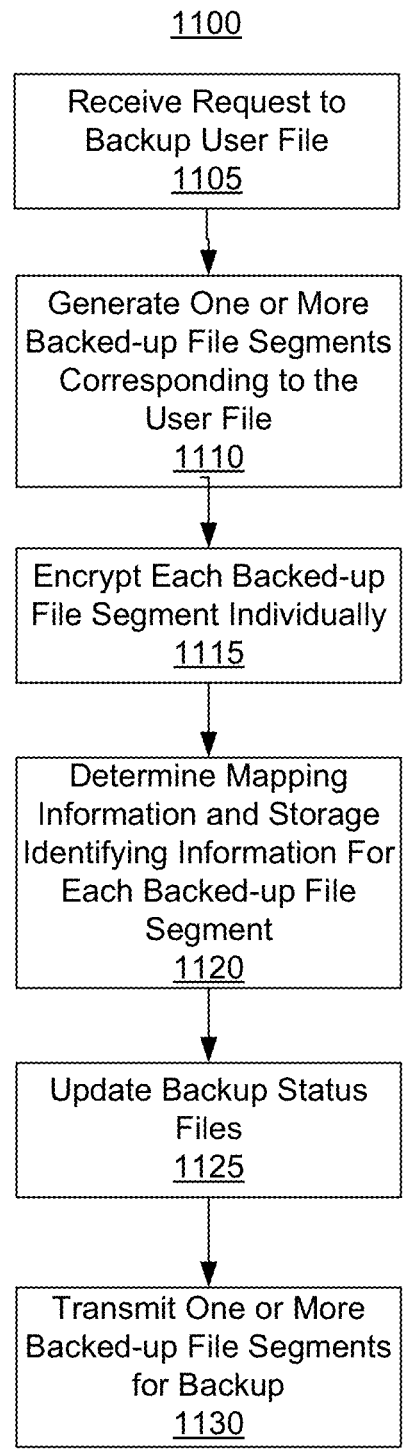
FIG. 11 is a flowchart illustrating backing up of user data from a client device, according to one embodiment of the present invention.

In FIG. 11, a flow chart 1100 relating to backing up a user file is shown, according to an exemplary embodiment. The client backup module 715 receives (step 1105) a request to backup a user file stored on a client device. The user file included in the request includes logical file contents and metadata. In some embodiments, the client backup module 715 advantageously generates (step 1110) one or more backed-up file segments (e.g., multiple buffers filled with data based upon the size of the user file) corresponding to the user file. For example, a user file having a size of 2,097,152 bytes is split into sixteen files, each file having a size of 131,072 bytes. In some embodiments, a cryptographic checksum for each file is recorded into the backup status file maintained by the client device.

Splitting up user files into multiple backed-up file segments provides several advantages. The backup management module 615 is configured to backup the user file in segments (i.e., one backed-up file segment at a time) such that work is not lost when backup is interrupted (e.g., network connection is unstable, client device is turned off, etc.). The backup management module 615 is configured to backup incrementally using the multiple backed-up file segments. In some embodiments, on subsequent backups, the blocks are compared against their original checksums to determine whether they have been modified and must be uploaded anew. For example, when a new message is downloaded to a 2 GB Outlook.pst file selected for backup, the backup management module 615 backups only the backup blocks that have been modified instead of backing up the entire 2 GB file again.

The client backup module 715 encrypts (step 1115) each generated file segment individually. In some embodiments, the client backup module 715 encrypts the blocks using a private key provided by the user. The client backup module 715 is not restricted to any encryption algorithm, and may use any symmetric, asymmetric, or hybrid asymmetric encryption algorithms, including but not limited to RSA scheme (e.g., PKCS#7, DES/DES3, Blowfish, IDEA, SEAL, Mars, RC4, SEED, etc). The client backup module 715 requests the encryption method and key from the user preference module 625. In some embodiments, the client backup module 715 also encodes and compresses the encrypted files.

The client backup module 715 determines (step 1120) mapping information and storage identifying information for each generated file segment. In some embodiments, the mapping information for each generated file includes bit ranges, size of the generated file, and/or other information associated with the generated file segment. The storage identifying information includes a server file name assigned to the generated file by the client backup module 715. In one embodiment, the server file name is a combination of computer information (e.g., client device information), session information, file information, and file version information. In other embodiments, the client backup module 715 requests from a server (e.g., a site management server, the data center management server 212, or the backup system management server 120) physical storage information for each generated file segment.

The client backup module 715 updates (step 1125) the backup status file associated with the user file with the corresponding mapping information and the storage identifying information associated with each backed-up file segment. In some embodiments, the backup status files are updated with any of the following information: last backup date and time of the user file, size of the user file, last modification date and time of the user file, the file system metadata associated with the client device, physical storage information for each file segment, bit ranges for each file segment, etc. The backup status files are stored in the storage device 775 of the client device 700. The client backup management module 715 backs up the backup status files and assigns them well known server file names.

The client backup management module 715 transmits (step 1130) one or more backed-up file segments for backup. In turn, the backup management module 615 backs up the one or more files corresponding to the user file to one or more storage volumes located in a single data center. In some embodiments, the backup management module 615 stores the one or more backed-up file segments corresponding to the user file on a single storage volume. Alternatively, the backup management module 615 stores the one or more backed-up file segments in multiple storage volumes on a single data center or on multiple data centers. In one embodiment, after transmitting the one or more backed-up file segments for backup, the client backup management module 715 may request and receive physical storage information of the one or more backed-up file segments and update the status backup file associated with the user file with the received physical storage information.

FIG. 12 illustrates an exemplary backup status file 1200. The backup status file 1200 includes backup status information 1235 for the "MyDocument.docx" file, stored in "C:\Users\Administrator\Documents" folder, located in the client device 700. As shown, the backup status file 1200 includes the size of the "MyDocument.docx" file in bytes, last date and time the "MyDocument.docx" file was modified, and last date and time the "MyDocument.docx" file was backed-up.

During backup of the "MyDocument.docx" file, the client backup module 715 generates one or more backed-up file segments corresponding to the "MyDocument.docx" file as described with respect to FIG. 11. For example, the "MyDocument.docx" file may be split into 16 backed-up file segments for storage, with each file having a size of 131,072 bytes. The illustrated backup status file includes mapping to physical files information 1240 necessary to restore or download the "MyDocument.docx" file. For each backed-up file segment, the exemplary status file includes backed-up file segment's address on the disk of a data center storing the backed-up file segment, and the size of the physical file. In other embodiments, the status file can include location information required to restore or download the "MyDocument.docx" file (e.g., byte ranges of the physical files, identification of SHA1s of the physical files).

In another embodiment, the physical locations of the backed-up file segments are not known to the client device. In this embodiment, the status file does not store the physical locations of the backed-up file segments. In some embodiments, the backup status file 1200 further stores mapping information including size of each generated backed-up file segment, bit range of each generated backed-up file segment, and other information necessary to restore, download, or access the "MyDocument.docx" file. In some embodiments, the backup status file 1200 further includes storage identifying information including server file names assigned by the client backup management module 715 to each generated backed-up file segment. The server file names assigned by the client backup management module 715 may include computer information (computer information associated the client device, computer information associated with a storage server storing the backed-up file segment, etc.), session information, file information, and file version information. Although it is contemplated that each user file is assigned a separate backup status file, a single backup status file may include information for multiple user files.

In some embodiments, the backup status file 1200 includes any combination of user file data format information, client configuration information, user account information, session information, server login information, backup scan information, restore information (e.g., restore status, percent completed, priority information, restore flags, etc.), statistical information about client operations (e.g., amount of files transferred), user computer device information, user file identification information, backup policy information (e.g., default policy information, user preferences information including file types to include and/or exclude from backup, backup priority information), scan status information (e.g., whether the user file has been modified since last scan, error information indicating errors from last scan, last scan time, etc.), backup status information (e.g., backed-up file is completely/partially backed-up, whether the backed-up file was in use during last backup attempt, server instructions to the client including instructions to resend the backed-up file, file version number information), backup stream format information (e.g., raw data format, Windows BackupRead/BackupWrite, MAC backup format, whether NTFS encryption is used, etc.), user file meta data information (e.g., creation date, modification date, size, SHA1 of contents, date of backup, Win32 file attributes, whether the user file is a directory, file, package directory, etc.), in progress restore information, etc. In some embodiments, the backup status file 1200 includes client file system metadata. The client file system metadata tracked in the backup status file 1200 may be used to structurally reconstruct the client file system, to ascertain whether files have been modified on the client device and need an incremental backup, and to determine the backup status of files.

Although the illustrated backup status file 1200 is shown in an Extensible Markup Language (XML) format, the backup status file 1200 may be in binary format, American Standard Code for Information Interchange (ASCII) format, and/or any other format.

Figure 13A:
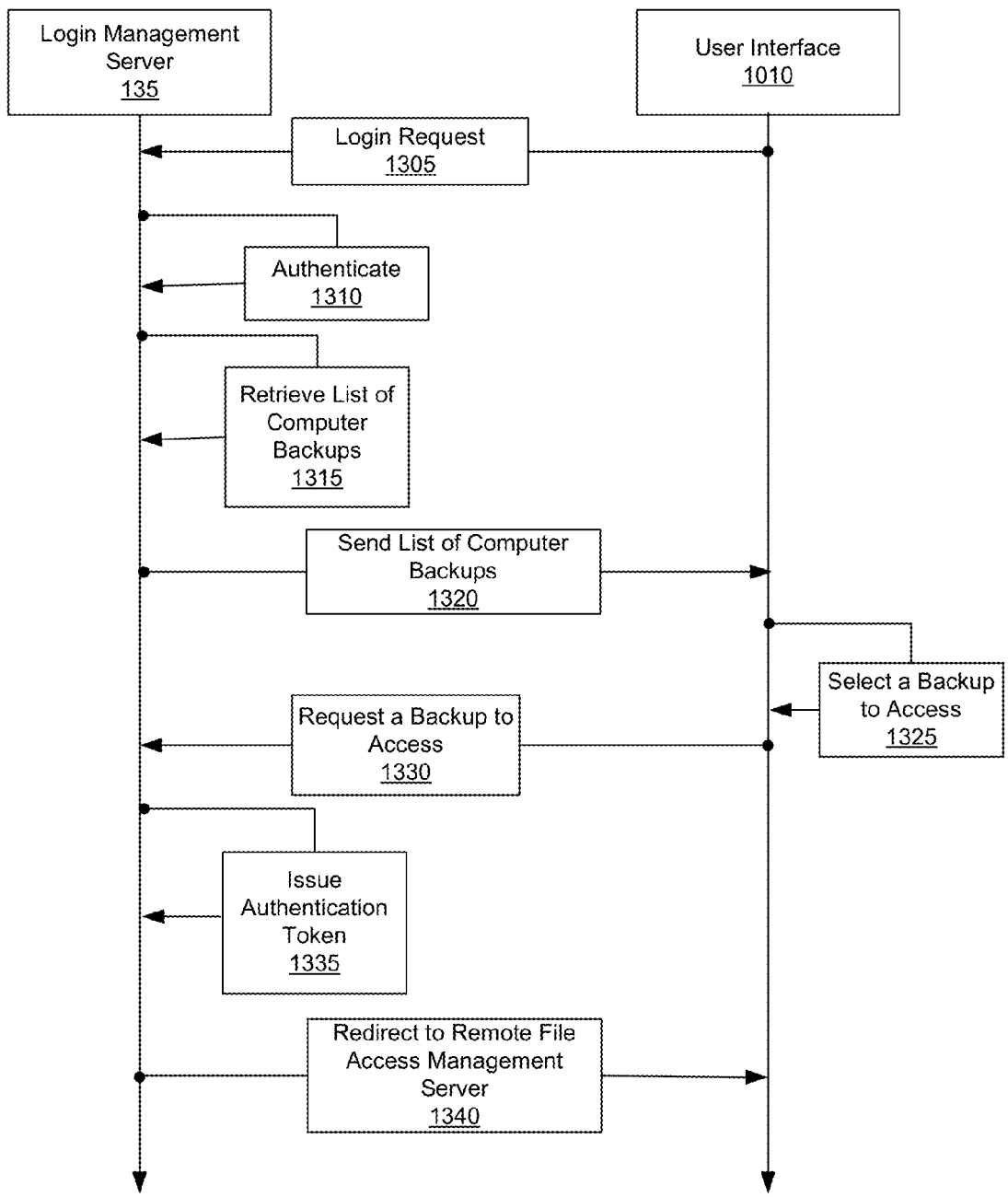
FIGS. 13A-B are sequence diagrams illustrating processing of remote data access requests, according to one exemplary embodiment.

In FIG. 13A, a sequence diagram 1300a relating to authenticating a user accessing a user interface 1010 to the login management server 135 is shown, according to an exemplary embodiment. The user enters authenticating information such as email address and password into the user interface 1010 (e.g., as illustrated in FIGS. 19A and 20A), which issues a login request (step 1305) to the login management server 135. The user authentication module 810 in the login management server 135 authenticates (step 1310) the user based on the authenticating information (e.g., user name, password, pass code, etc.) entered by the user. The backup reporting module 820 retrieves (step 1315) a listing of backups available to the user. For example, the user may have files backed-up from three client devices including a MAC laptop, a Dell laptop, and a work computer. In this example, the backup reporting module 820 sends (step 1320) a list of computer backups back to the user interface 1010, the list including the MAC laptop, the DELL laptop, and the work computer. In turn, the user interface 1010 displays the list of available computer backups to the user. In one embodiment, the login management server 135 stores information regarding user's data backups including a list of computers the user has selected for backup in the storage device 875 (e.g., account database) or another storage in the login management server 135. In other embodiments, any of the management servers described herein (e.g., site management server) store the user's backup information.

At step 1325, the user selects a particular client device backup from a list of available data backups. For example, the user may choose to access backup from the MAC laptop. In other embodiments, a default backup is automatically selected for the user. Based on the backup selected by the user, the user interface 1010 sends a backup access request (step 1330) to the login management server 135. The authentication token management module 815 issues (step 1335) an expiring authentication token. The authentication token management module 815 stores the issued authentication token into the storage device 875 (e.g., accounts database) or other storage in the login management server 135. In some embodiments, the authentication token expires after a predetermined period of time. In other embodiments, any of the management servers described herein (e.g., site management server) store information regarding the authentication token.

The login management server 135 determines a remote file access management server responsible for accessing the user's backed-up data. In some embodiments, the storage device 875 stores information regarding a remote file access management server 220 responsible for accessing the backed-up data selected by the user. At step 1340, the login management server 135 redirects the user interface 1010 to the appropriate remote file access management server 220. In some embodiments, the login management server 135 sends to the remote file access management server 220 the authentication token as part of a query string included in the URL. In some embodiments, the authentication token is a randomly generated string. In other embodiments, the authentication token is a cryptographically signed token.

Figure 13B:
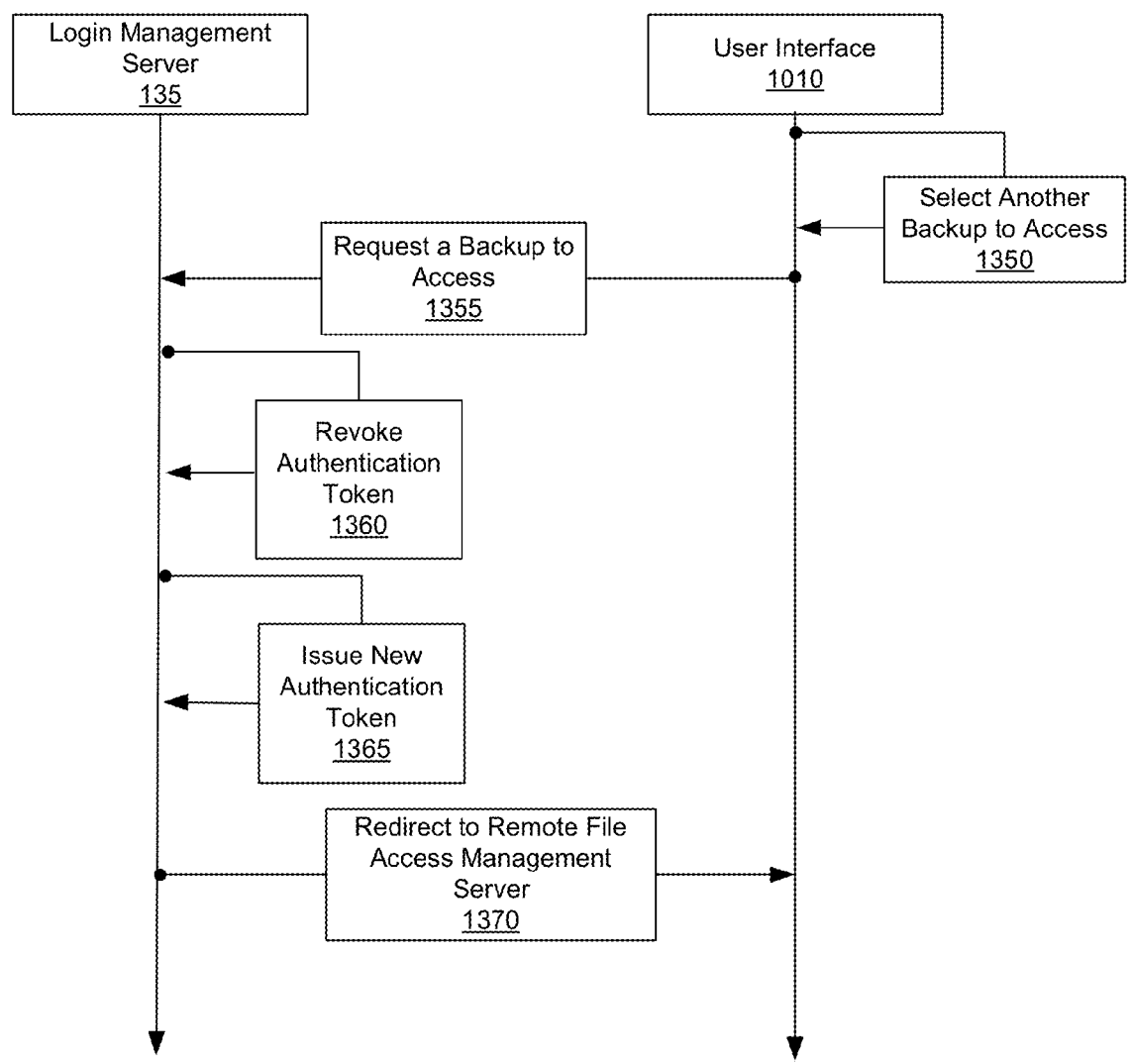

In FIG. 13B, a sequence diagram 1300b relating to the user electing to access another backup is shown, according to an exemplary embodiment. For the example, the user may have previously elected to remotely access backed-up data from a particular client device (e.g., the MAC laptop). In this example, the user may subsequently elect to remotely access data backed-up from another client device (e.g., the Dell laptop). When the user selects (step 1350) another client device backup, the user interface application module 915 logs the user out of the remote file access management server 220 and re-directs the user back to the login management server 135. The user may be still authenticated at the login management server 135 because the HTTP session remained active. The user interface 1010 sends a backup access request (step 1355) to the login management server 135 based on the new backup selected by the user.

In some embodiments, the authentication token management module 815 revokes (step 1360) the authentication token previously generated for accessing the first client device, and issues (step 1365) a new authentication token to be used for accessing the user backed-up data associated with the newly selected backup. The authentication token management module 815 saves the newly generated authentication token into the account database or other storage in the login management server 135. In other embodiments, the new authentication token is not stored in the login management server storage. In some embodiments, the authentication token validation module 910 of the remote file access management server 220 revokes the authentication token.

The login management server 135 determines a remote file access management server 220 responsible for accessing the user's backed-up data, and redirects (step 1370) the user interface 1010 to the appropriate remote file access management server 220. In some embodiments, the login management server 135 sends the newly generated authentication token as part of the query string included in the URL.

Figure 14A:
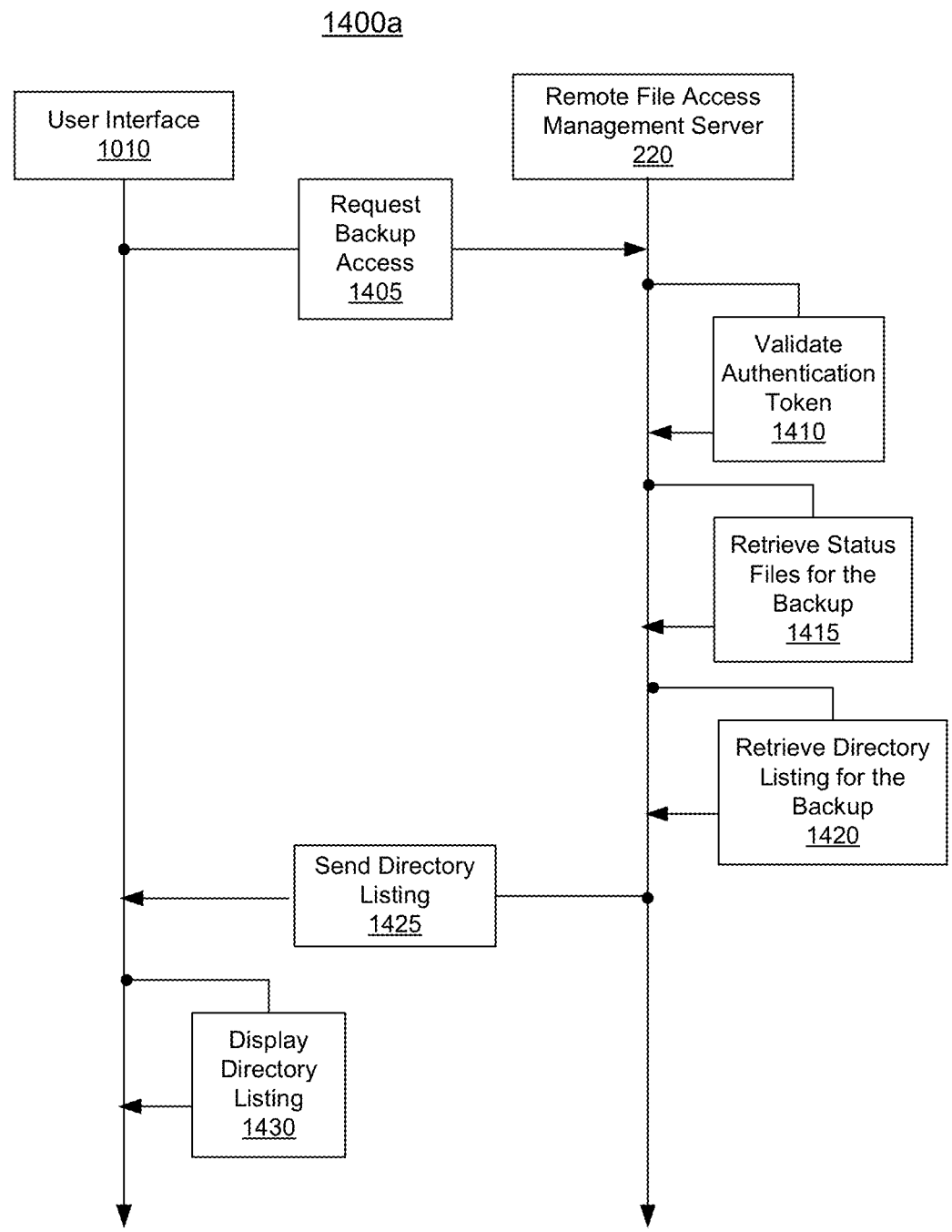
FIGS. 14A-B are sequence diagrams illustrating processing of remote directory listing requests and remote file access requests, according to one exemplary embodiment.

In FIG. 14A, a sequence diagram 1400a relating to satisfying a request from a user interface 1010 to access a computer backup is shown, according to an exemplary embodiment. When the user requests access to a particular computer backup (step 1405), the login management server 135 refers the user interface 1010 to the remote file access management server 220. At step 1410, the authentication token validation module 910 validates the authentication token. The authentication token validation module 910 requests authentication token validation information from the authentication token management module 815. In some embodiments, the authentication token validation module 910 accesses the accounts database or another storage of the login management server 135 to retrieve authentication token information necessary for validating the authentication token. In other embodiments, the authentication token validation module 910 stores the validation information locally to perform further validation without having to access login management server storage 875. In some embodiments, the authentication token validation module 910 validates the authentication token for every directory listing request received from the user.

At step 1415, the remote file access management module 920 retrieves backup status files associated with the computer backup selected by the user. In some embodiments, the backup status files are stored in one or more storage volumes 216a, 216b-216z in the data center A 110a. In some embodiments, the remote file access management module 920 saves the retrieved backup status files to its local storage device 975. In some embodiments, the remote file access management module 920 builds indexes for the cached backup status files to efficiently respond to requests. Using the status backup files, the remote file access management module 920 retrieves (step 1420) and returns (step 1425) to the user interface 1010 a directory listing associated with the selected backup. The retrieved directory listing includes a list of drives on the backed-up computer, a list of backed-up folders, etc. The user interface 1010 displays the directory listing to the user as shown in FIGS. 18, 19E, and 20C.

Figure 14B:
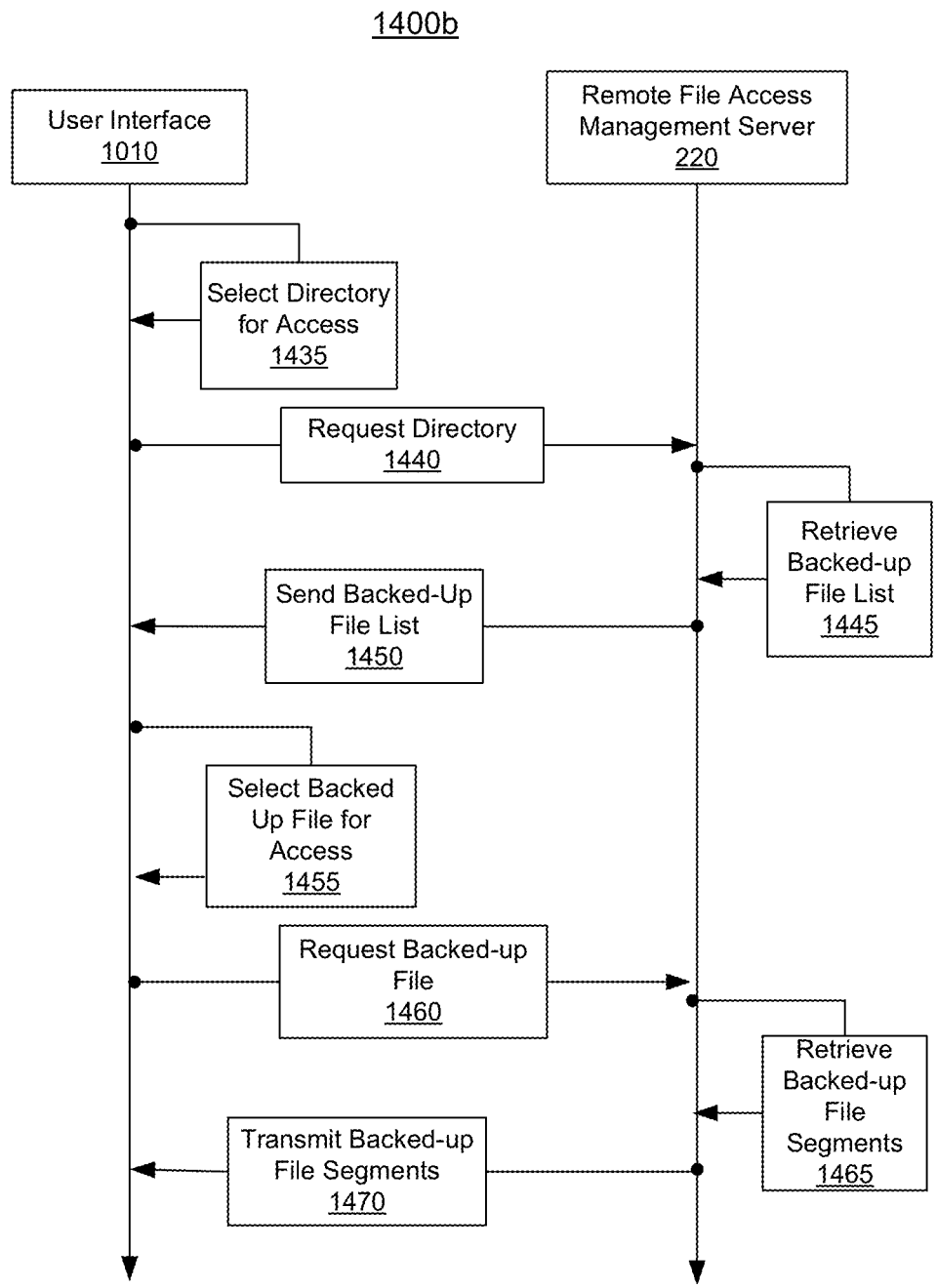

In FIG. 14B, a sequence diagram 1400b relating to satisfying a request from a user interface 1010 to access a particular folder or directory, and download a particular file is shown, according to an exemplary embodiment. Using the user interface 1010, the user selects (step 1435) a particular folder in order to view a list of files that are backed-up in the selected folder. The user interface application module 915 sends a request (step 1440) to the remote file access management module 920 for a directory listing for the selected folder. Using the status backup files retrieved in step 1415, the remote file access management module 920 retrieves (step 1445) requested directory listing information and transmits (step 1450) the retrieved directory listing information back to the user interface 1010. The retrieved directory listing includes a list of backed-up files associated with the selected folder. The retrieved directory listing also includes a directory listing of any subfolders associated with the selected folder. The user interface 1010 displays the listing of backed-up files in the right panel window 1820, as shown in FIG. 18.

As shown in FIG. 18, the user expands the directory tree by clicking on a triangle icon next to a directory or folder of interest. As described above, the user interface application module 915 sends a request to the remote file access management module 920 for a directory listing for the selected folder. Using the status backup files, the remote file access management module 920 retrieves (step 1445) and returns (step 1450) to the user interface 1010 the requested directory listing including a listing of subfolders for the selected folder.

After the user selects (step 1455) particular backed-up file, the user interface application module 915 sends (step 1460) a request to the remote file access management module 920 to retrieve the selected backed-up file. In some embodiments, the request includes backed-up file identification (e.g., file id) and the authentication token. The user interface application module 915 retrieves (step 1465) one or more backed-up file segments corresponding to the backed-up file and transmits (step 1470) these file segments back to the user interface 1010.

Figure 15:
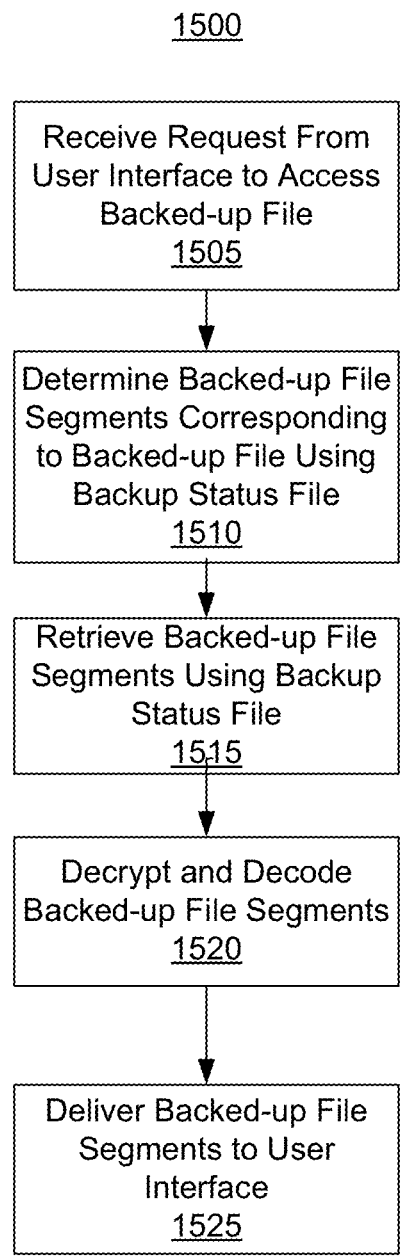
FIG. 15 is a flowchart illustrating retrieving requested backed-up file from storage, according to one embodiment of the present invention.

FIG. 15 illustrates a flow chart 1500 relating to satisfying a request from the user interface 1010 to remotely access a particular backed-up file, according to an exemplary embodiment. At step 1505, the user interface application module 915 receives a request from the user interface 1010 to access a particular backed-up file.

In some embodiments, the user interface application module 915 validates the selected backed-up file by confirming that the backed-up file exists, that the backed-up file is not a directory, and/or that the backed-up file is not already in the client's cache (e.g., using HTTP cache coherence protocol). Validation of the client cache is further described in FIG. 16.

At step 1510, the remote file access management module 920 determines one or more backed-up file segments corresponding to the backed-up file using backup status file associated with the backed-up file. For example, the backup status file may include mapping information such as bit maps for each file segment (i.e., backed-up file segment stored in storage) and storage identifying information (e.g., file server names for each file segment). In another example, the backup status file may include physical storage information for each backed-up file segment. Using the information stored in the backup status file, the remote file access management module 920 retrieves (step 1515) the backed-up file segments from storage. At step 1520, the remote file access management module 920 decrypts and decodes (step 1520) each of the file segments associated with the backed-up file. At step 1525, the decrypted and decoded files are transmitted back to the user interface. In some embodiments, the remote file access management module 920 communicates with one or more site management servers and/or one or more storage servers to download the one or more backed-up file segments corresponding to the backed-up file.

In some embodiments, the user interface application module 915 requests the length of the backed-up file from the remote file access management module 920. The remote file access management module 920 determines the length of the backed-up file by decrypting and decoding one or more backed-up file segments using the user's private key. The user may upload a private key to the remote file access management server 1304 for the duration of the remote file access session. In other embodiments, the client device 700 stores a private key locally. Once the remote file access management module 920 returns the exact length of the backed-up file to the user interface application module 915, the decrypted and decoded data is discarded.

The user interface application module 915 uses the exact length of the backed-up file to retrieve the one or more backed-up file segments corresponding to the backed-up file. In these embodiments, the user interface application module 915 decrypts and decodes the backed-up file segments into blocks of data, and using the length of the backed-up file, streams the blocks one at a time back to the user interface 1010, thereby reducing ongoing memory consumption during the download. The user interface application module 915 is configured to indicate to the user download progress using the backed-up file length. In some embodiments, the blocks are streamed to the user through a secure connection such that encryption of the blocks during streaming is not necessary.

Figure 16:
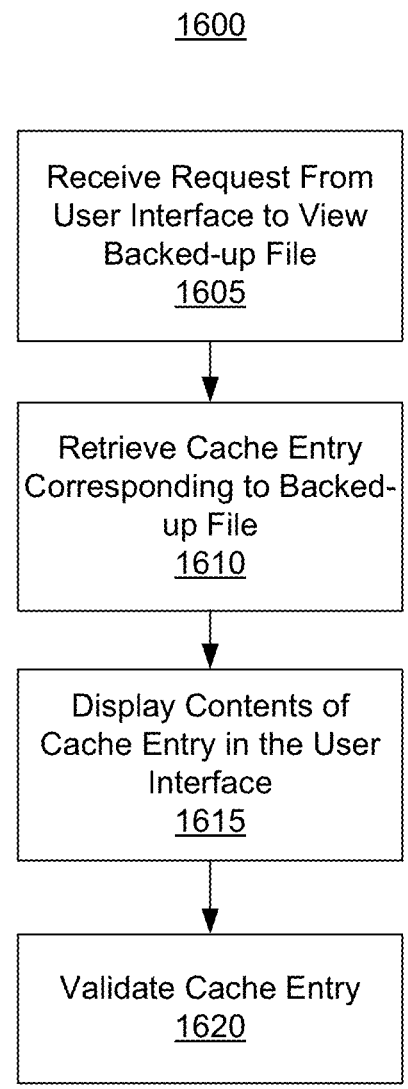
FIG. 16 is a flowchart illustrating client cache validation, according to one embodiment of the present invention.

In FIG. 16, a sequence diagram 1600 relating to validation of a client cache storing accessed backup files, according to an exemplary embodiment. The cache validation module 730 may maintain a cache for storing data associated with backed-up folders and files accessed by the user via a user interface 1010, thereby saving bandwidth, and improving user experience and remote access performance.

At step 1605, the cache validation module 730 receives a request from the user interface 1605 to access a particular backed-up file. The cache validation module 1610 retrieves (step 1610) a cache entry from the cache corresponding to the requested backed-up file. If the cache does not contain a cache entry for the requested backed-up file, steps 1610-1620 are not performed, and the backup file is retrieved from storage as described in FIG. 15.

Once the cache entry corresponding to the backed-up file is retrieved from the cache, the contents of the cache entry are displayed (step 1615) in the user interface. After the contents of the cache entry are displayed in the user interface, the cache validation module 730 asynchronously validates the retrieved cache entry. In some embodiments, validation of the cache entry involves transmitting a conditional request to the remote file access management server 220 including data associated with the cache entry (e.g., last modification date, a hash value of the backed-up file). In these embodiments, the response to the conditional request includes a code indicating that the backed-up file has not been modified, or a new copy of the backed-up file. For example, the Hypertext Transfer Protocol may be used for cache validation technique described above.

Figure 17:
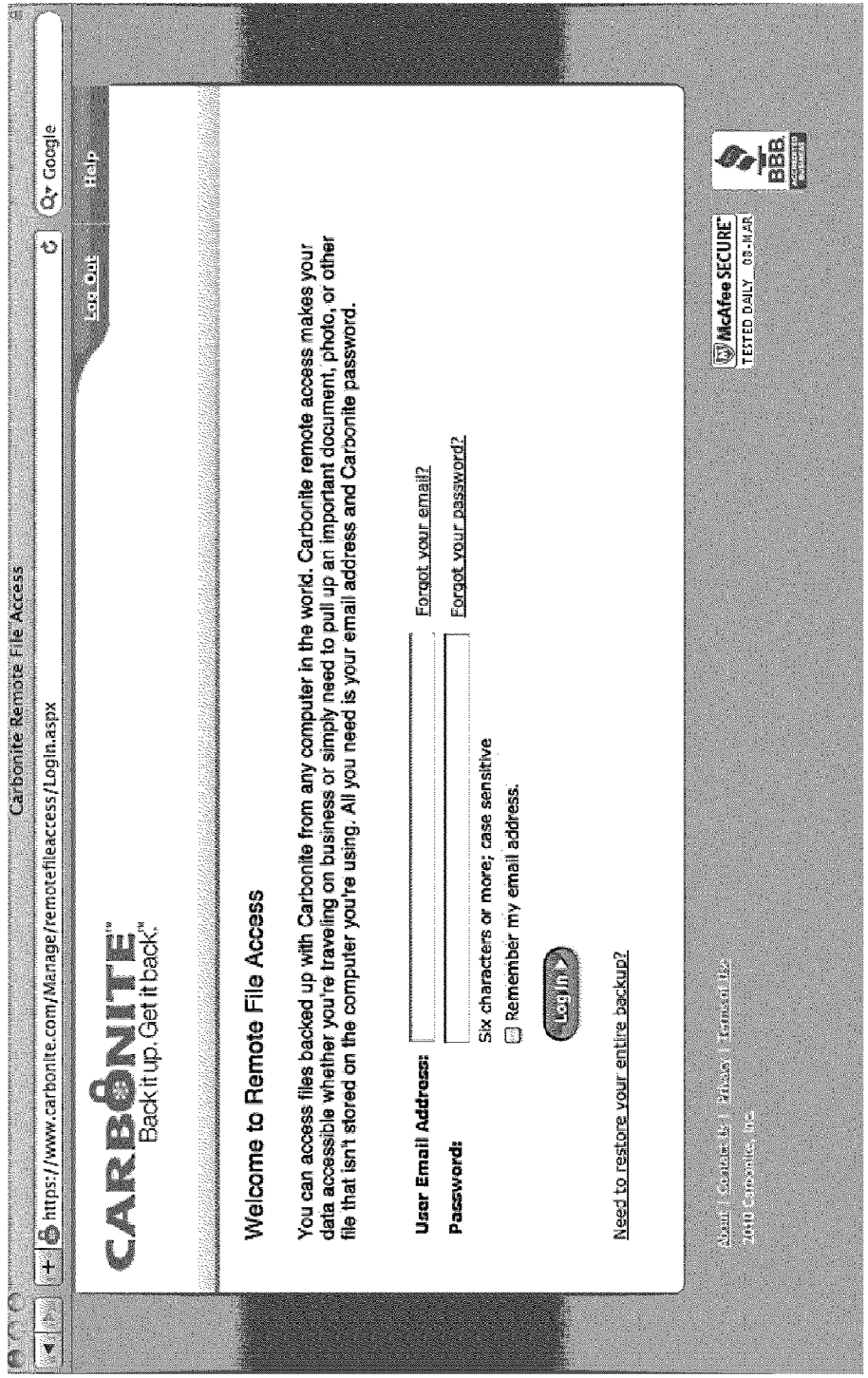
FIG. 17 illustrates an exemplary user interface, according to one exemplary embodiment.

FIG. 17 illustrates a screenshot of an interface 1700 allowing the user to log into a user interface 1010 (i.e., a web browser) to remotely access files included in the user's backup. The interface 1700 displays a prompt for a user email address and a password. In other embodiments, the user is prompted for other authenticating information (e.g., last four digits of social security number, user name, security questions, etc.). Once the user enters the user email address and password, the login management server 135 authenticates the user. Upon successful authentication, a user interface 1800 shown in FIG. 18 is displayed to the user.

FIG. 18 illustrates a screenshot of the user interface 1800 allowing the user to access and download individual files that are part of the user's backup. If the user is backing up multiple computers or client devices, then the user selects a particular computer from which the user would like to access the files. For example, the user may have files backed-up from a MAC laptop, a Dell laptop, and a work computer. When the user selects the MAC laptop, a list of folders backed-up from the MAC laptop including a list of drives on the MAC laptop is shown in the left panel window 1810. Once the user selects a folder that contains a file of interest to the user, a list of files backed-up from that folder is shown in the right panel window 1820. As illustrated, the right panel window 1820 shows information regarding files including file names, file sizes, and last modified date of the files. In other embodiments, other file information is displayed to the user including whether the file is fully backed-up, whether the file is in the middle of backup, last backup date and time, etc. The user accesses and downloads a particular file by clicking on the name of the file.

FIGS. 19A-19L illustrates screenshots of mobile phone user interfaces allowing the user to remotely access directories and files that are part of the user's backup. Although the various illustrated mobile phone user interfaces are iPhone user interfaces, similar user interfaces are contemplated for any other type of mobile phone including Droid, Blackberry, etc.

FIG. 19A illustrates a screen shot of a user interface 1900*a* for logging into a phone application allowing remote access to backed-up data. As illustrated, the user is asked to enter an email and password in order to login into the phone application.

Figure 19B:
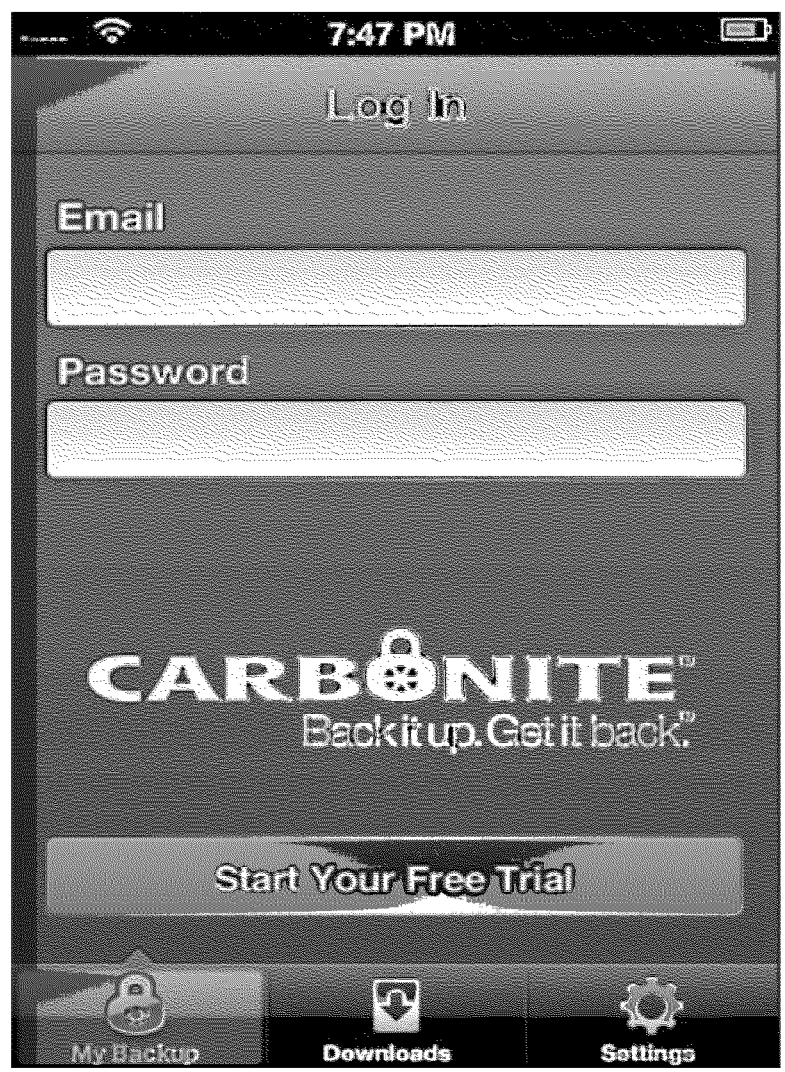
Figure 19C:
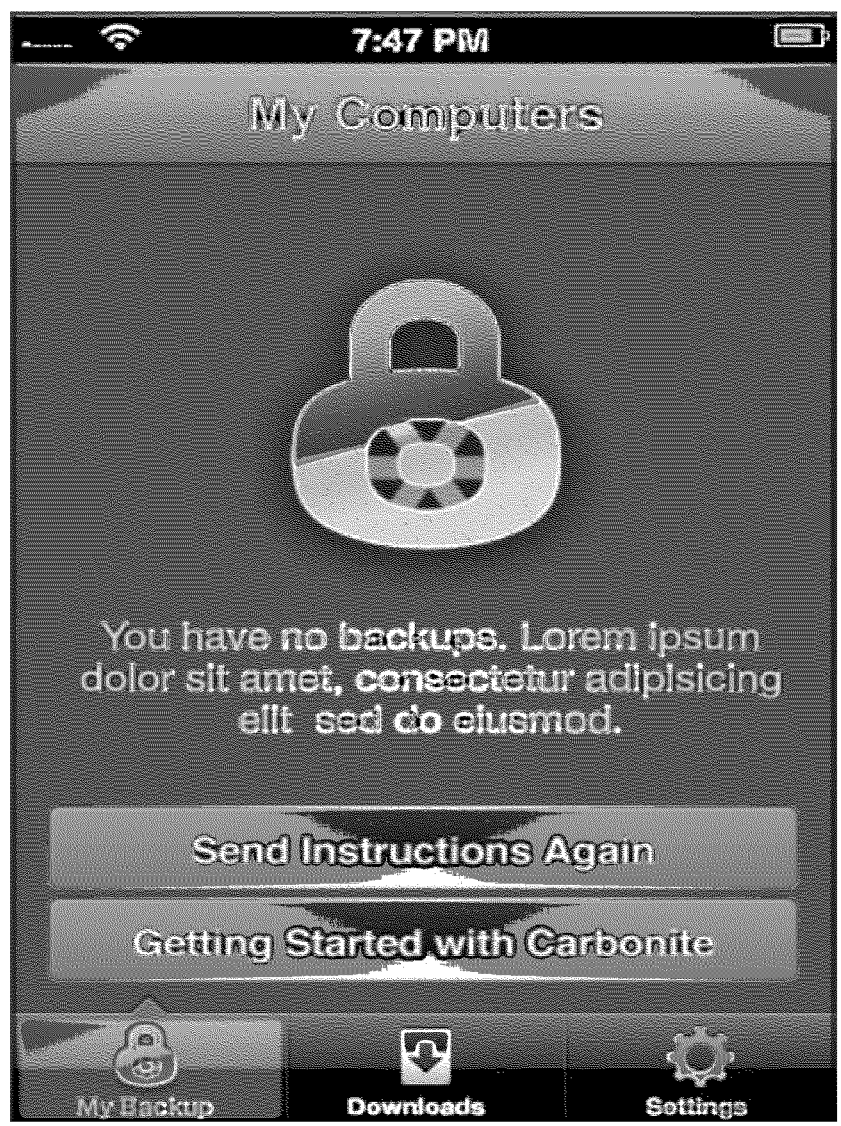
Figure 19D:
Figure 19E:
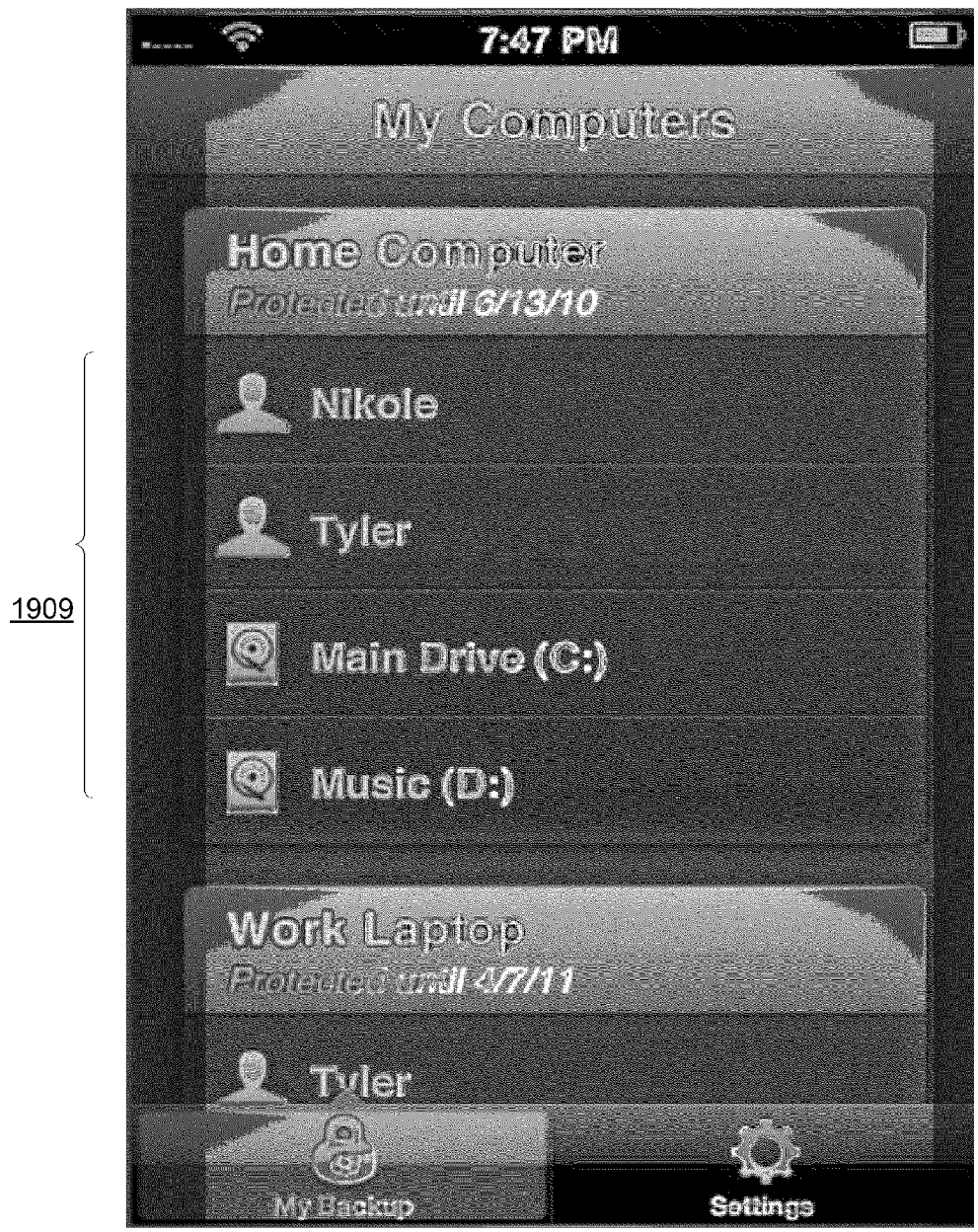
Figure 19F:
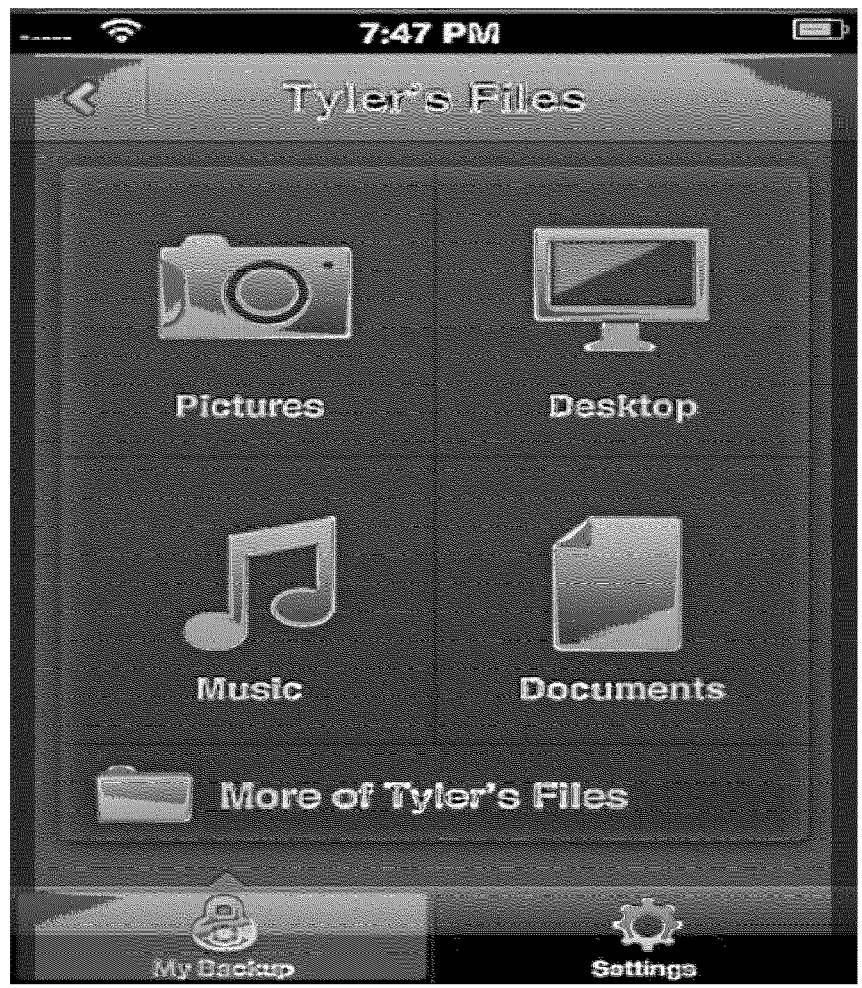
Figure 20A:
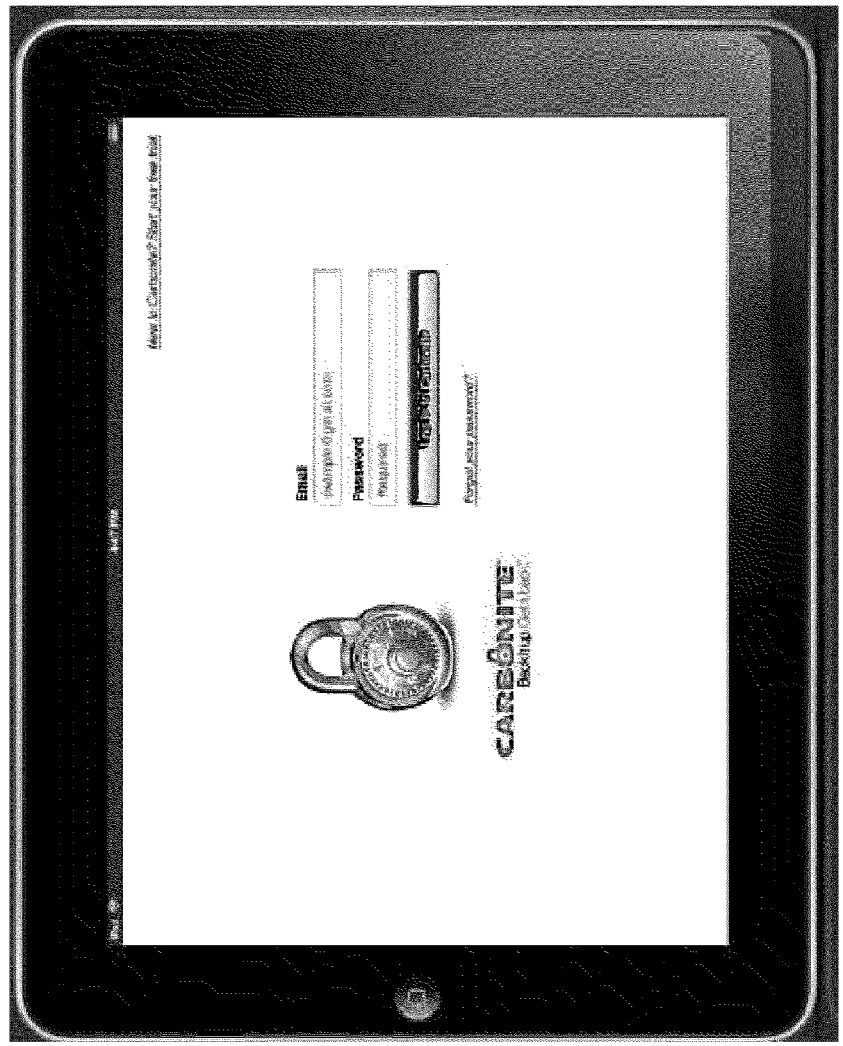
FIGS. 20A-20I illustrates exemplary tablet computer user interfaces facilitating remote data access, according to one exemplary embodiment.

FIG. 19B allows the user to sign up for the online backup subscription service using the mobile phone application. Once the user provides a user name and password as requested in an interface 1900*a* as shown in FIG. 19A or 1900*b* as shown in FIG. 19B, an interface 1900*c* as shown in FIG. 19C instructs the user that no backups are currently available for the user. Once the user has at least one client device backed-up, a user interface 1900*d* as shown in FIG. 19D illustrates a listing of available computers. For example, as shown in FIG. 19D, backed-up data from a home computer 1905 and a work laptop 1907 are available to the user. FIG. 19E illustrates a user interface 1900*e* showing data categories 1909 of backed-up data associated with the home computer including data for two users Nikole and Tyler and directories Main C:\ drive, D:\ drive used for music associated with the backed-up home computer. For example, as further illustrated in the user interface 1900*f* shown in FIG. 19F, Tyler's files 1910 include pictures, desktop, music, documents, and other types of files.

Figure 19G:
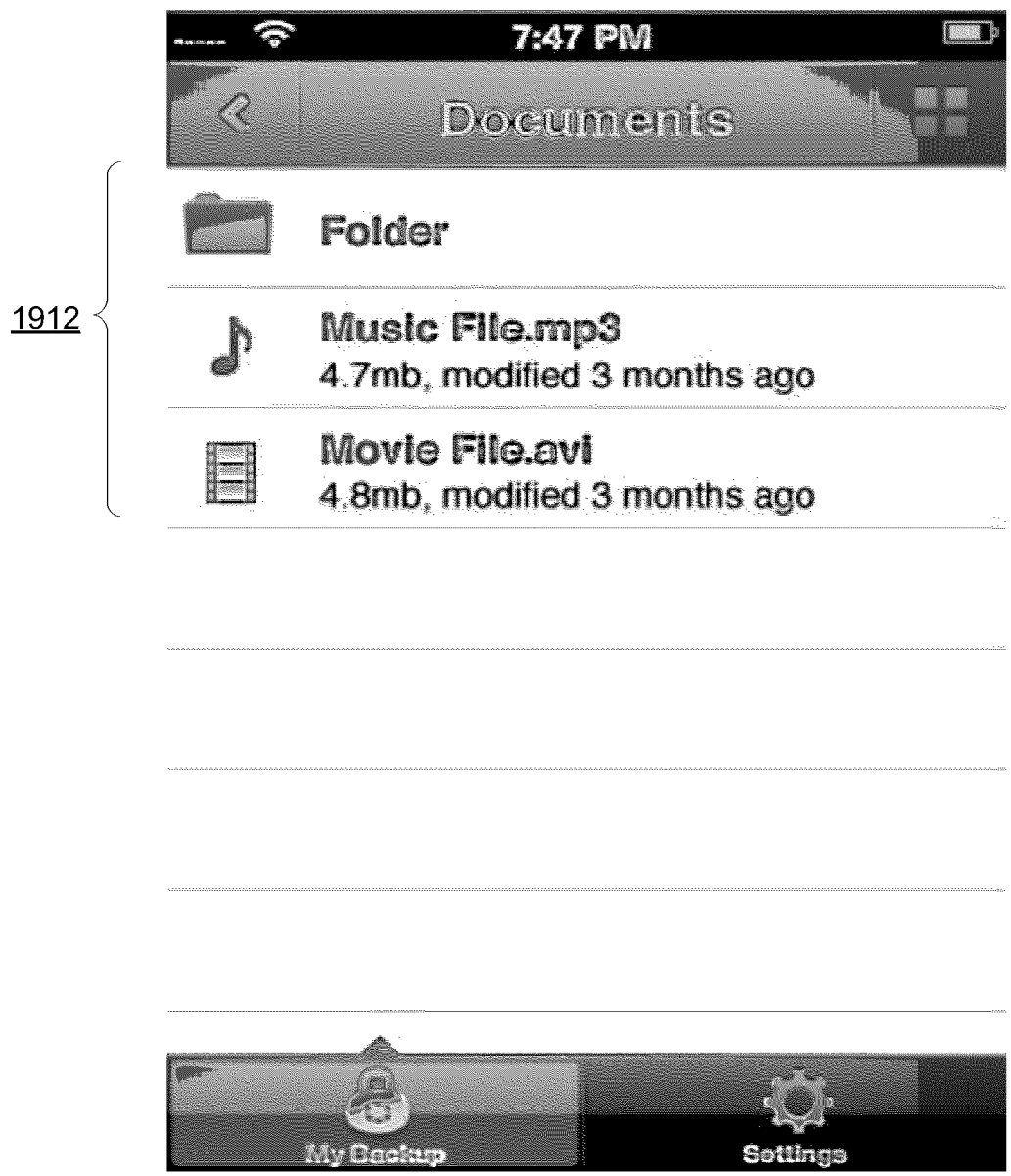
Figure 19H:
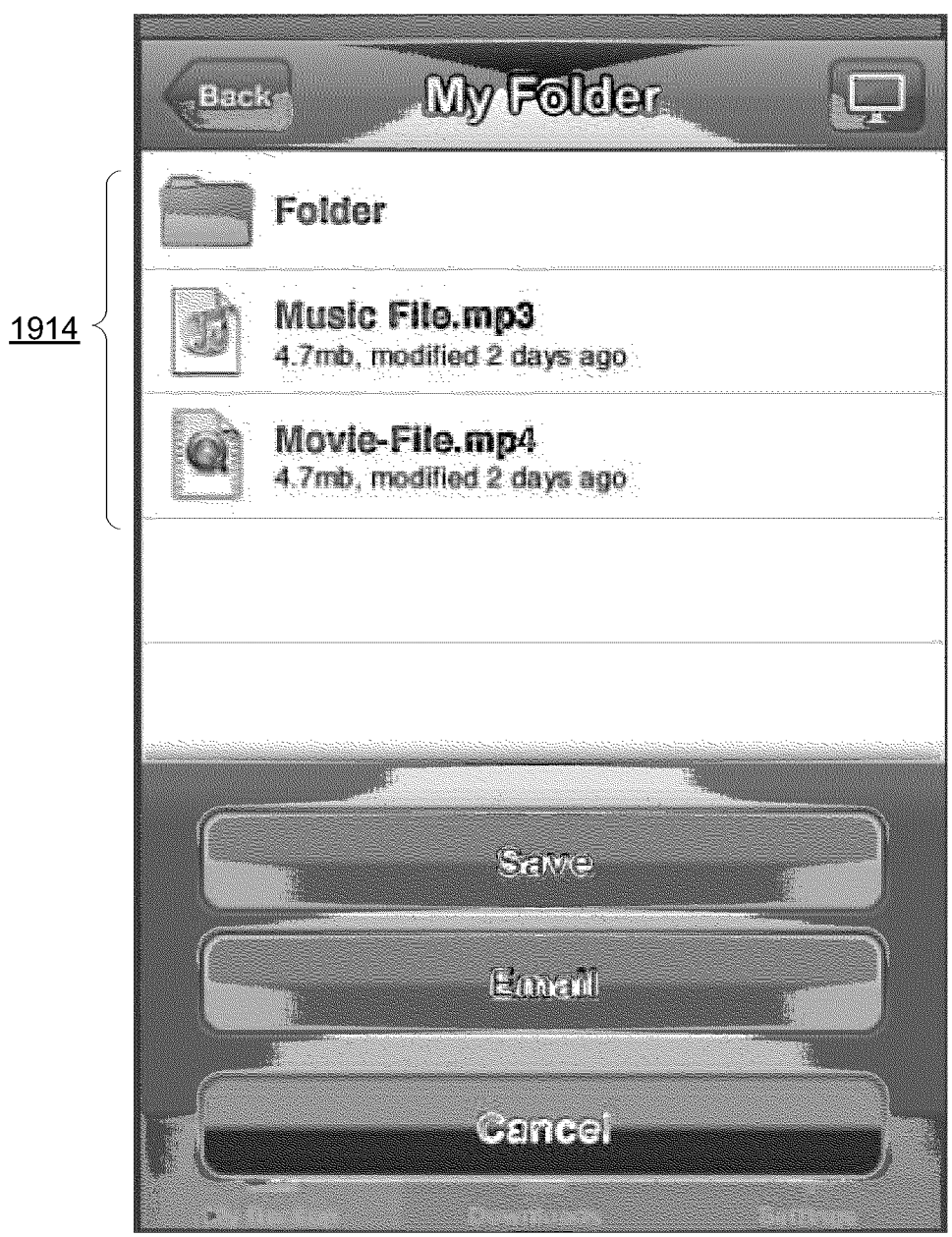

FIG. 19G illustrates a user interface 1900*g* showing contents 1912 of a "Documents" directory including a sub folder, a music file, and a movie file. Similarly, FIG. 19H illustrates contents 1914 of "My Folder" including a sub folder, a music file, and a movie file. As shown in FIG. 19H, each individual file shown in the user interface 1900*h* may be saved or shared via email.

Figure 19I:
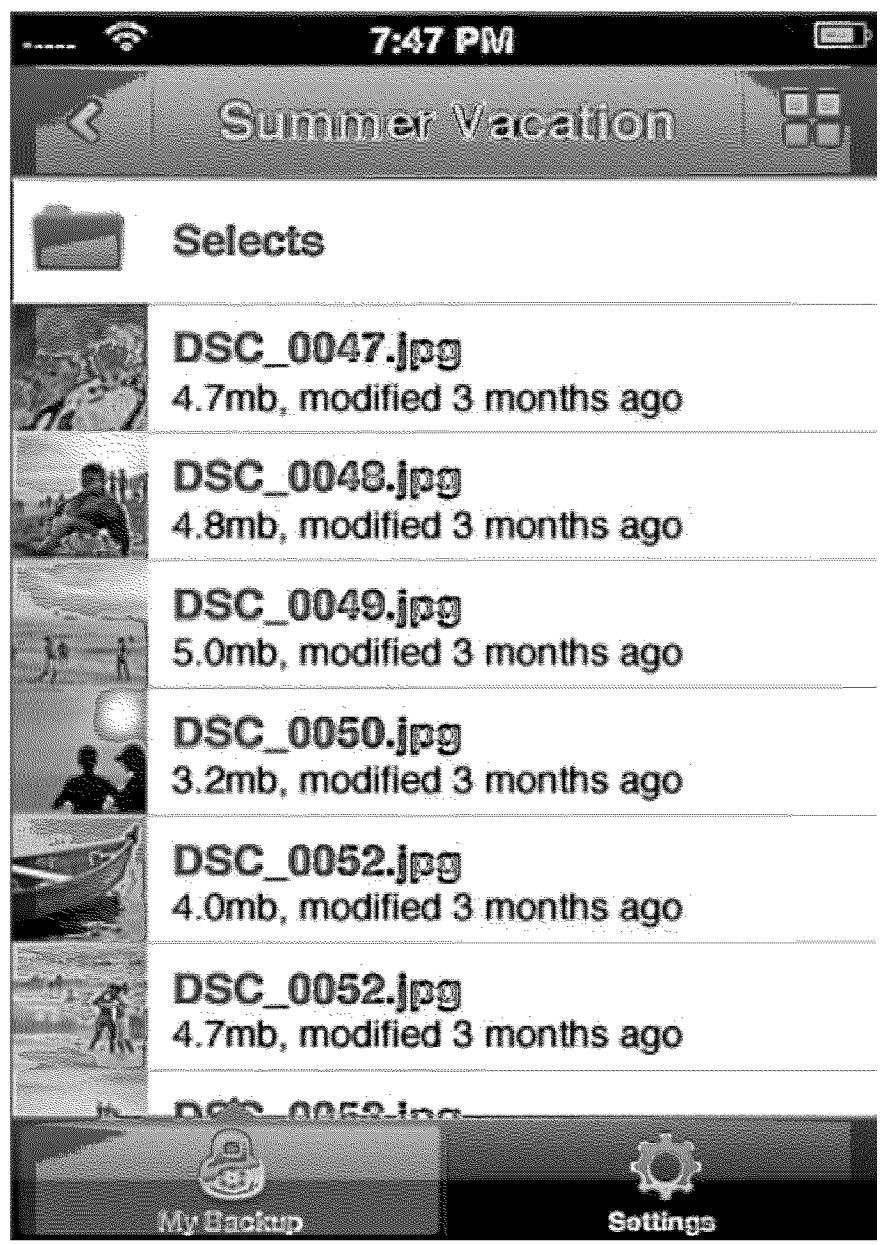
Figure 19J:
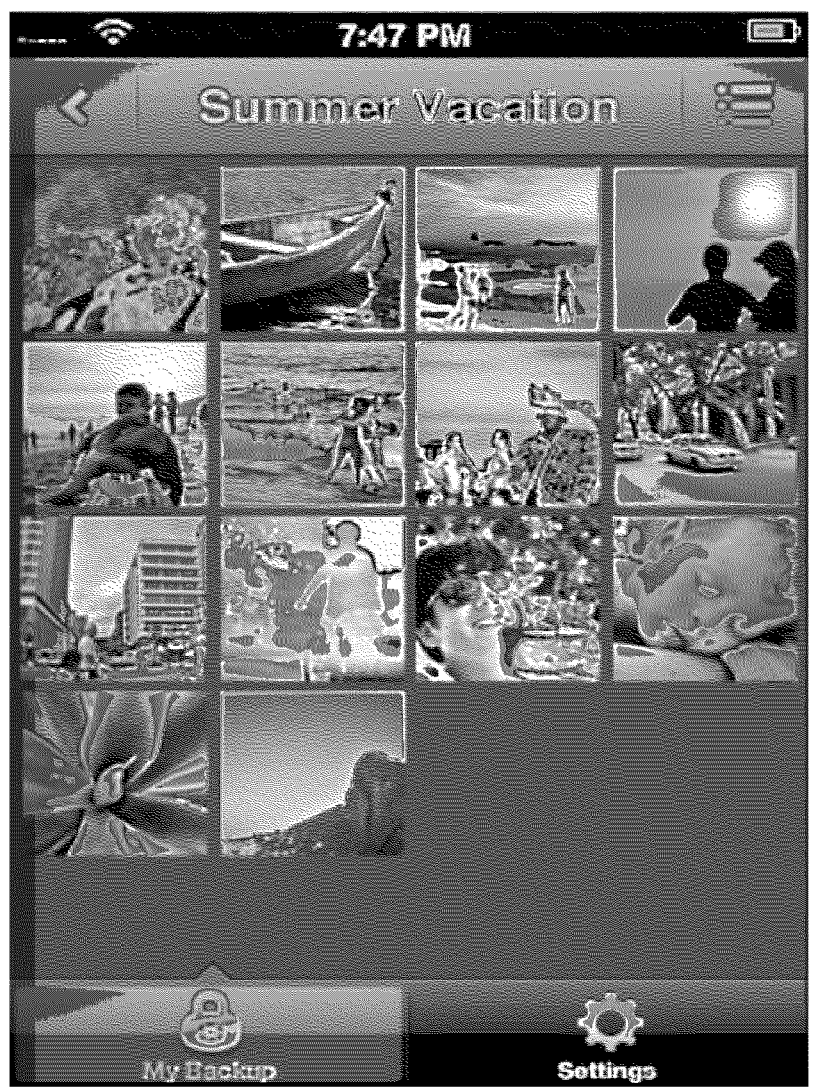

FIG. 19I illustrates a user interface 1900*i* displaying contents of a "Summary Vacation" folder including a sub folder "Selects", and a listing of picture files. The user interface 1900*j* shown in FIG. 19J allows the user to view the picture files stored in the "Summer Vacation" folder as thumbnails.

Figure 19K:
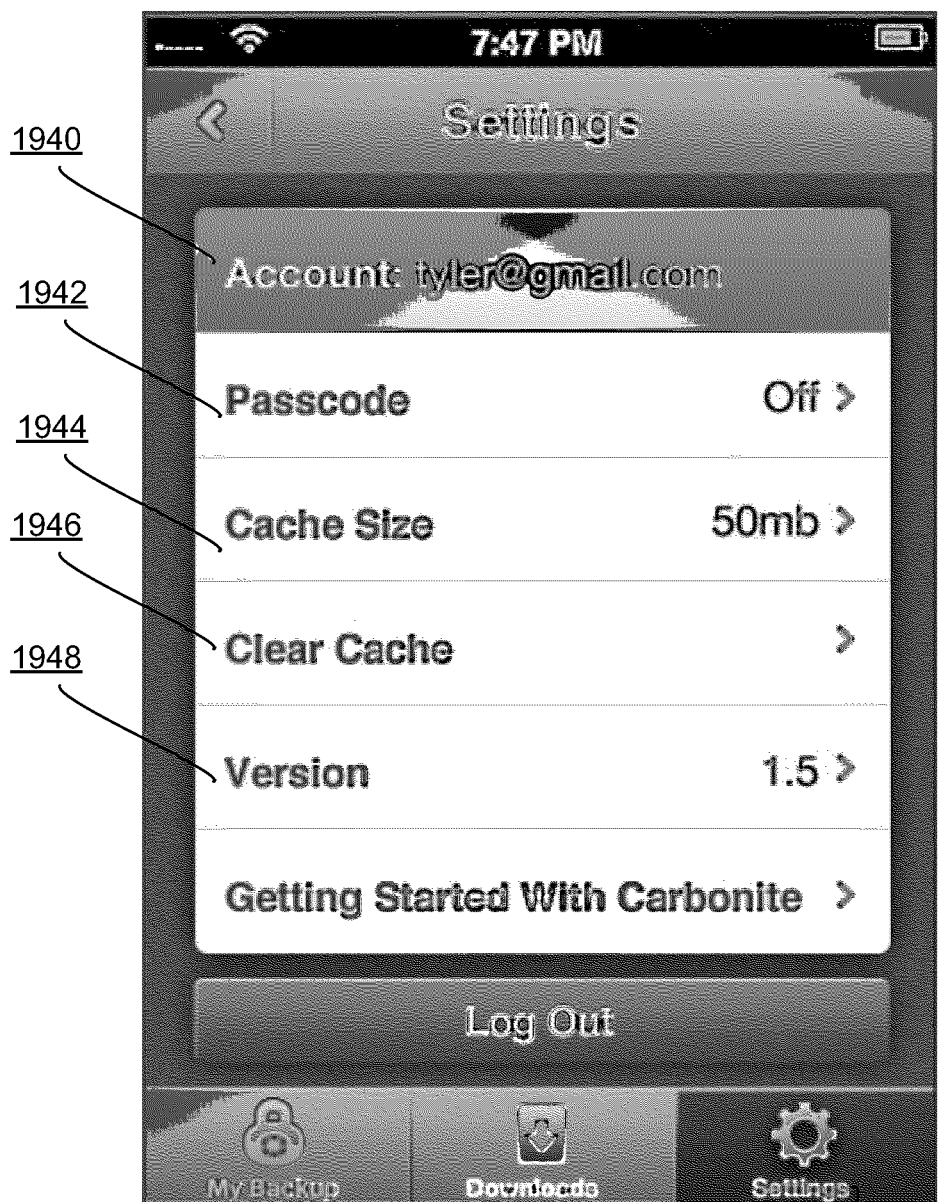
Figure 19L:
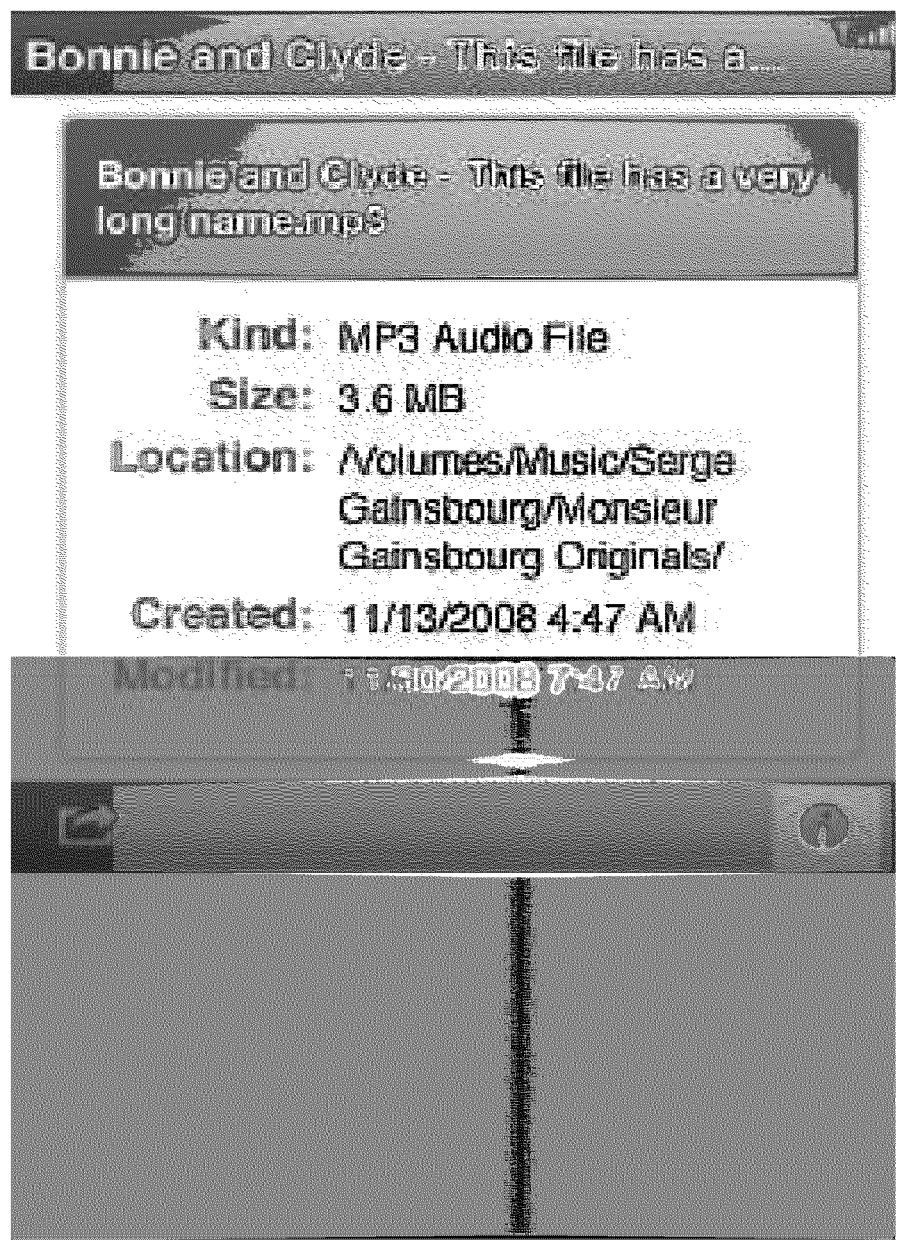

A user interface 1900*k* shown in FIG. 19K allows the user to view and/or update settings associated with the mobile phone application by clicking on the settings icon 1950. The settings information displayed to the user in the user interface 1900*k* includes user email address information 1940, a passcode option 1942 (e.g., enabled or disabled), cache size information 1944 (e.g., 50 Mb), an option to clear cache 1946, and mobile phone application version information 1948. A user interface 1900*l* illustrated in FIG. 19L allows the user to view various information associated with a backed-up file including file type (e.g., MP3 audio file), size of the file, location, creation date and time, and last modification date and time.

FIGS. 20A-20I illustrate screenshots of user interface of a tablet personal computer allowing the user to remotely access directories and files that are part of the user's backup. Although the various illustrated tablet personal computer interfaces are iPAD user interfaces, similar user interfaces are contemplated for any other type of tablet personal computer.

FIG. 20A illustrates a screen shot of a user interface 2000*a* for logging into a phone application allowing remote access to backed-up data. As illustrated, the user is asked to enter an email and password in order to login into the phone application.

Figure 20B:
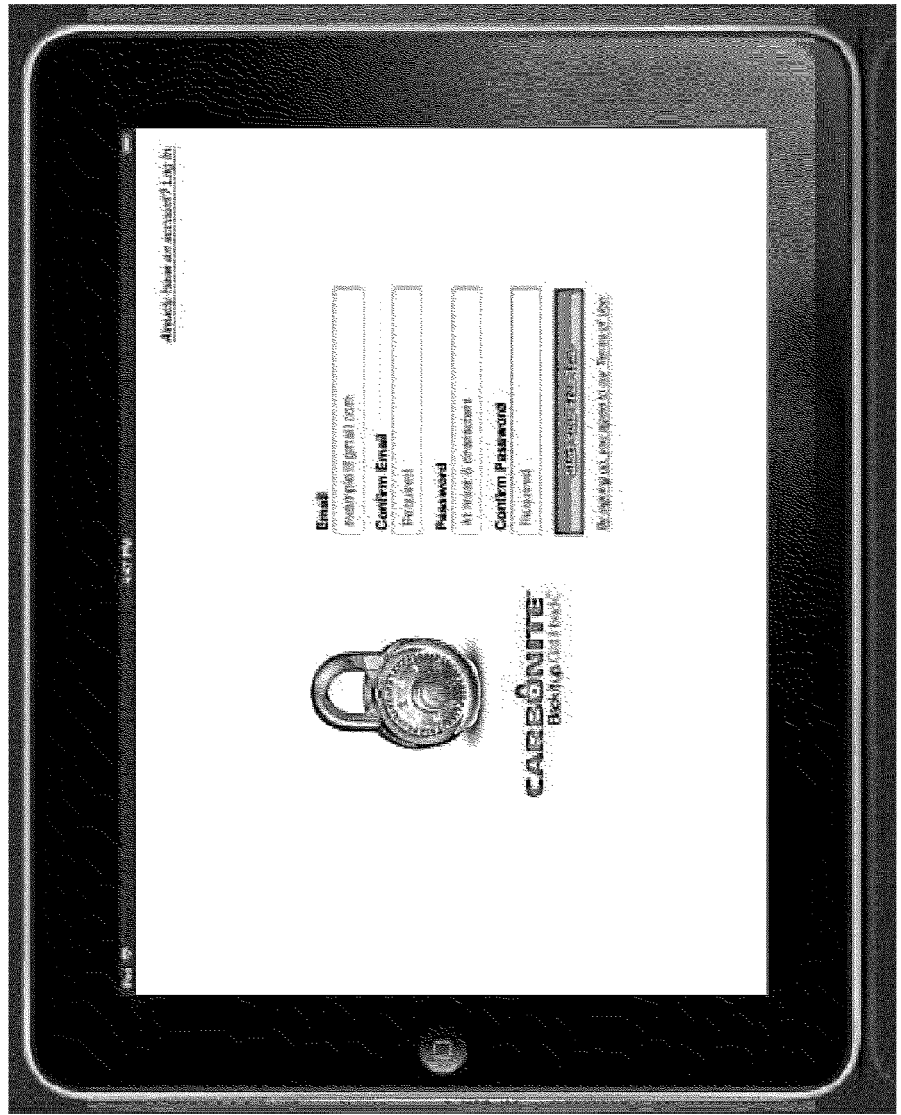
Figure 20C:
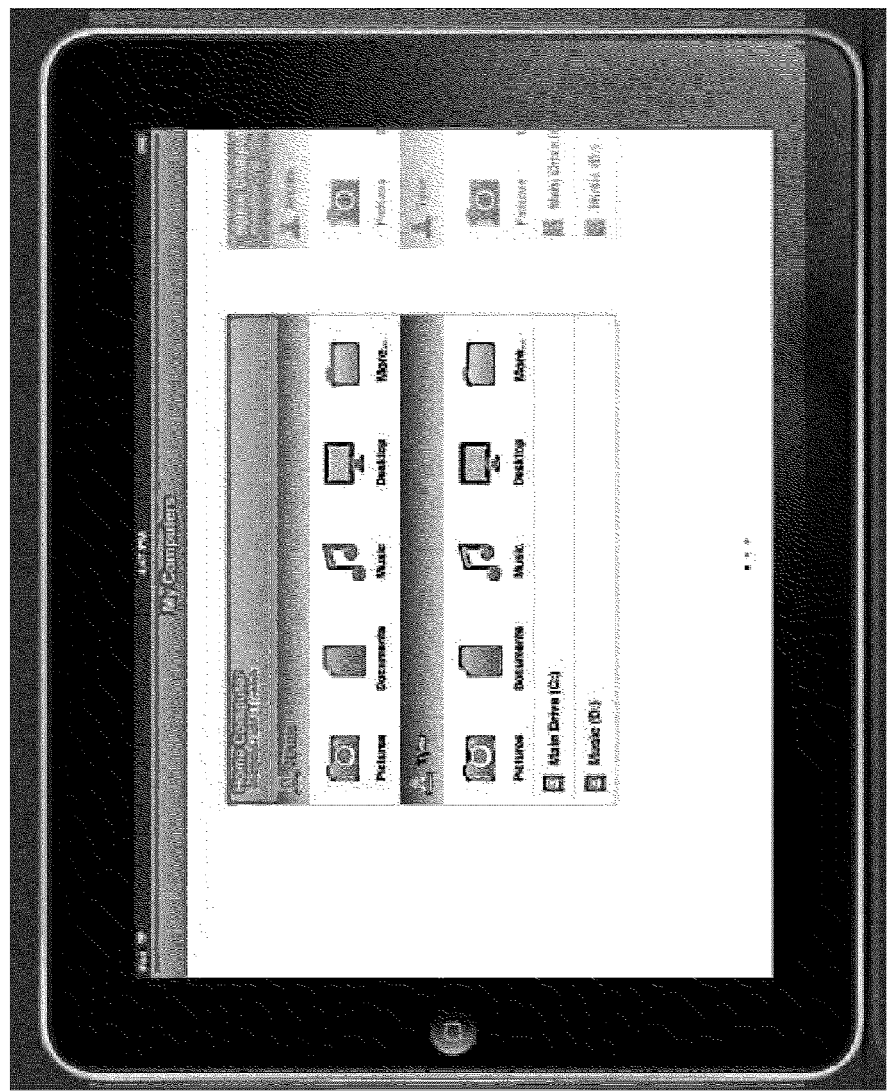
Figure 20D:
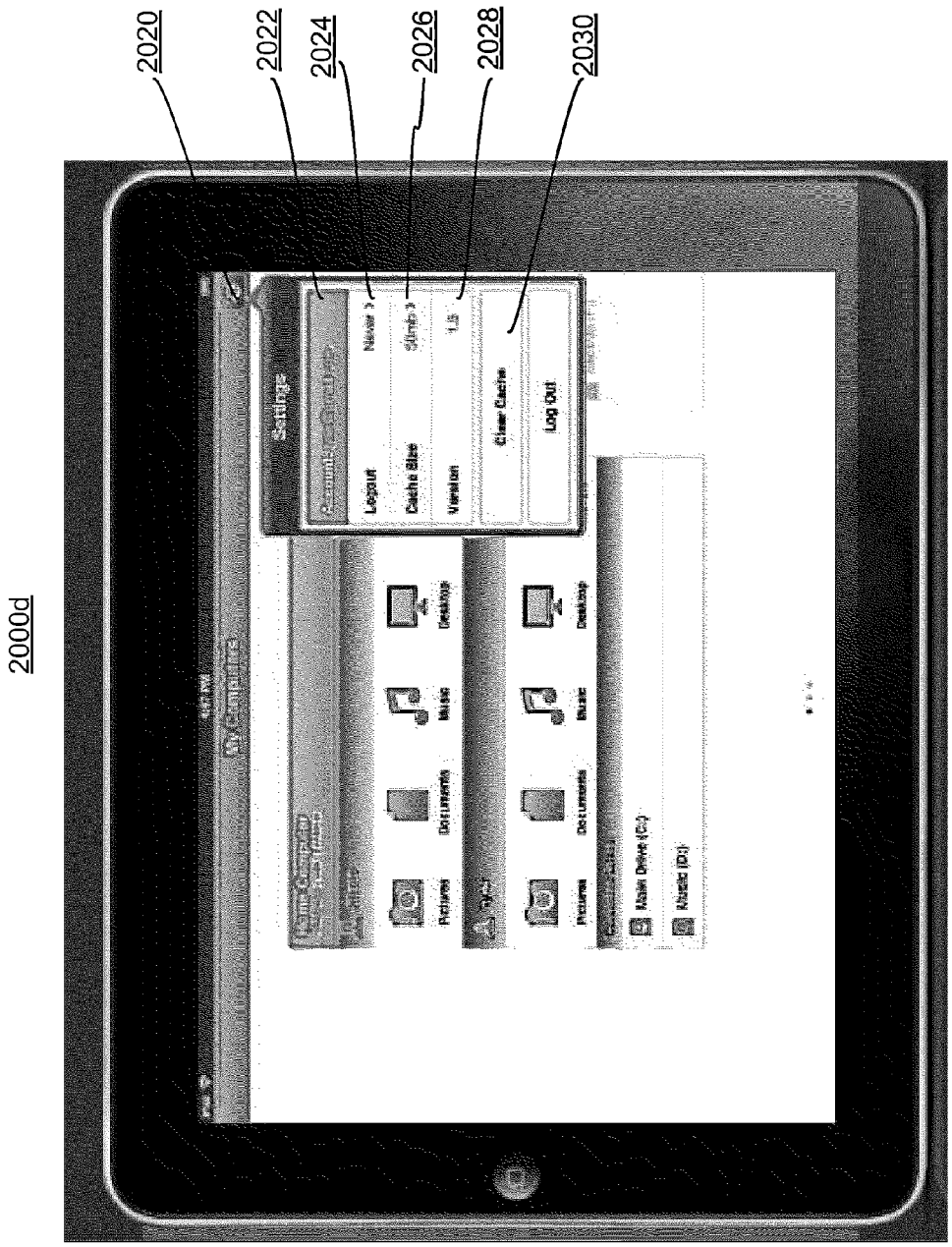

FIG. 20B illustrates a screen shot of a user interface 2000*b* allowing the user to sign up for the online backup subscription service using the mobile phone application by entering an email address and password information as shown in a user interface 2000*b*. Similar to FIGS. 19D-F, user interfaces 2000*c* and 2000*d* shown in FIGS. 20C-20D allow the user to view backed-up data for the "Home Computer" including data for two users, Nikole and Tylers, as well as "Main Drive (C:) and "Music (D:)". The user interface 2000*d* allows the user to view and/or update settings associated with the mobile phone application by clicking on the settings icon 2020. The settings information displayed to the user in the user interface 1900*k* includes user email address information 2022, logout information 2024, cache size information 2026 (e.g., 50 Mb), mobile phone application version information 2028, and an option to clear cache 2030.

Figure 20E:
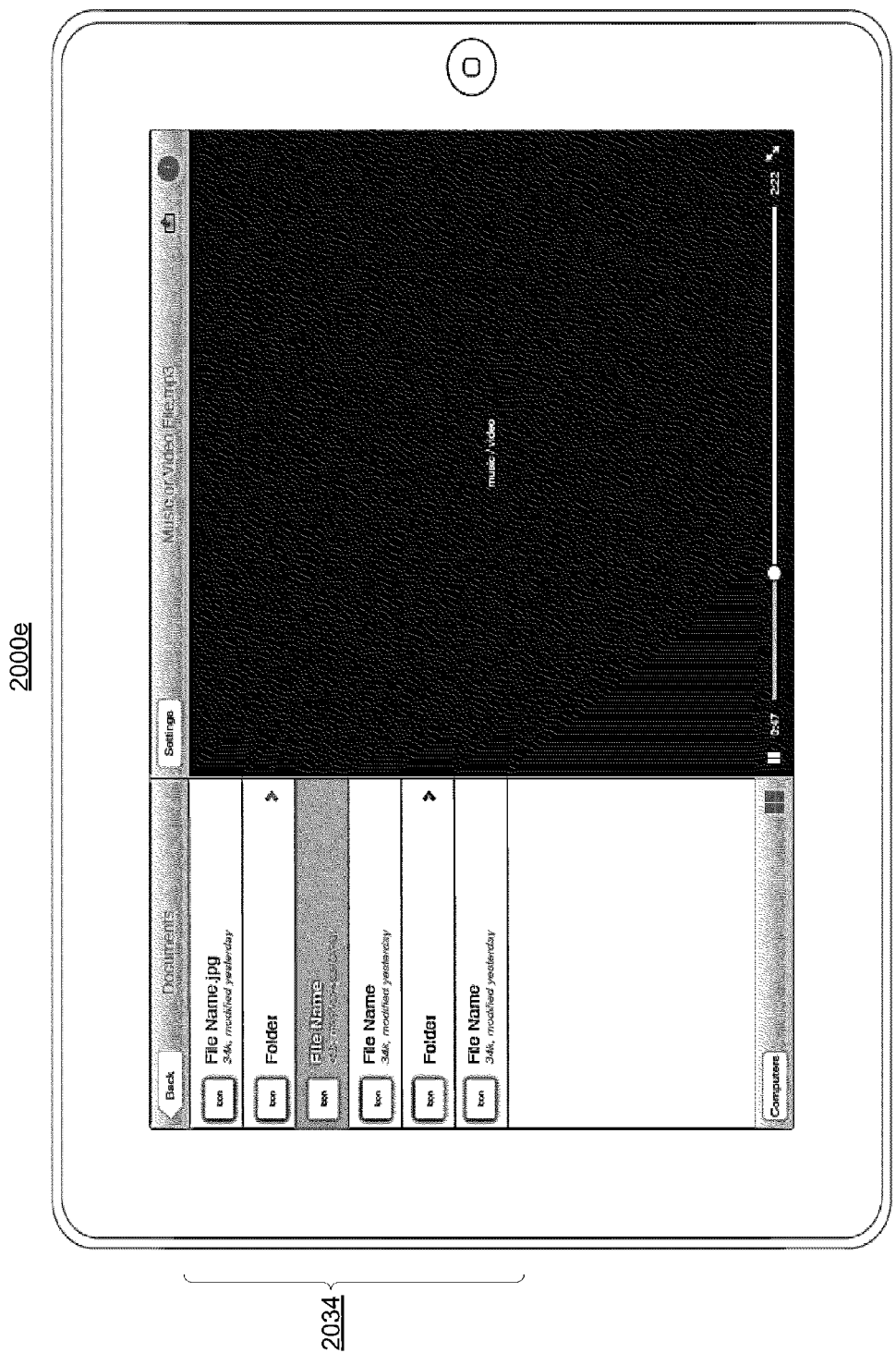
Figure 20F:
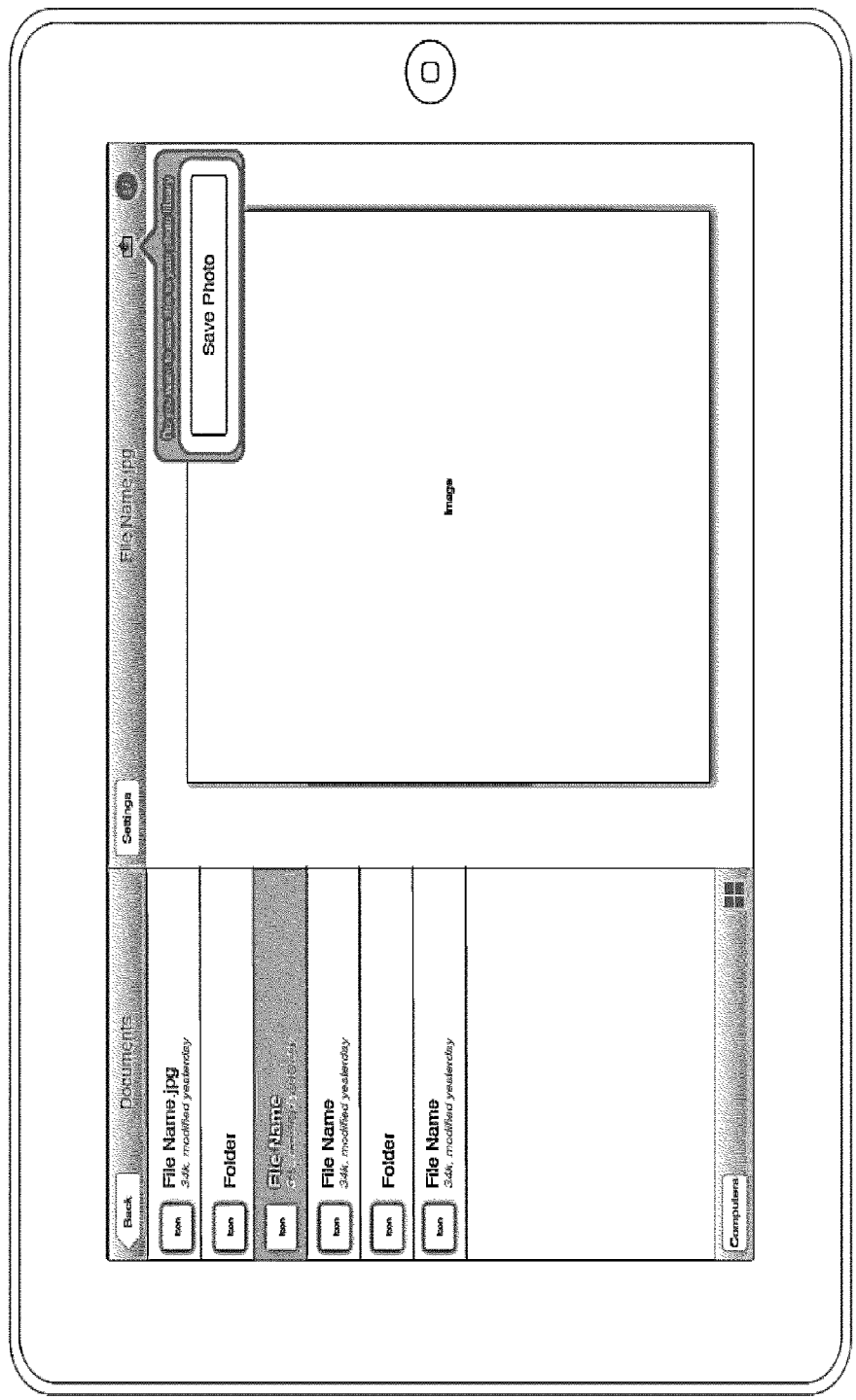

FIG. 20E illustrates a screen shot of a user interface 2000*e* displaying a listing of files 2034 stored in the "Documents" folders. The user interface 2000*e* also illustrates that a music or video file stored in the "Documents" folder may be played. Similar to FIG. 19H, FIG. 20F illustrates that each individual file shown in the user interface 2000*f* may be saved.

Figure 20G:
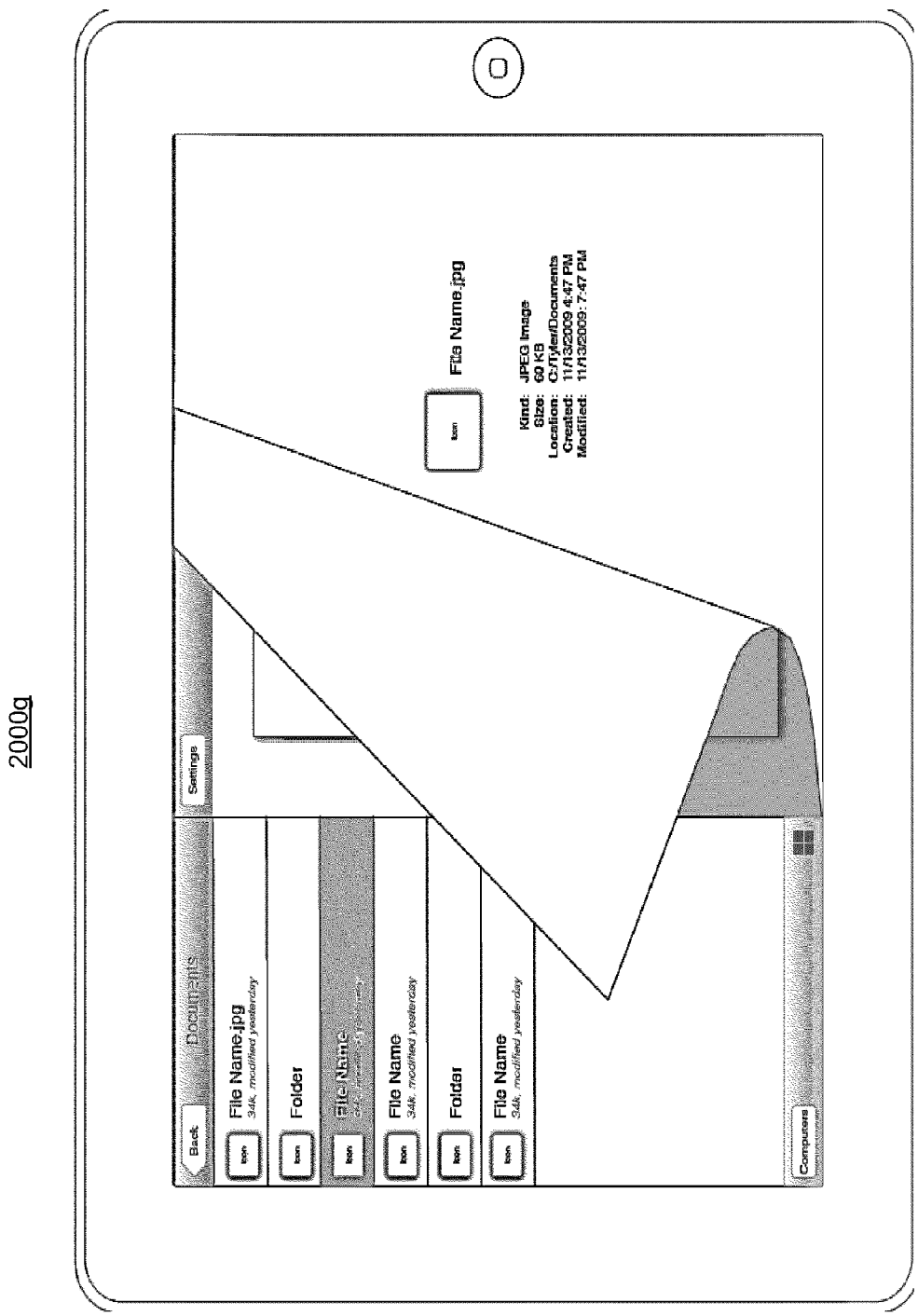
Figure 20H:
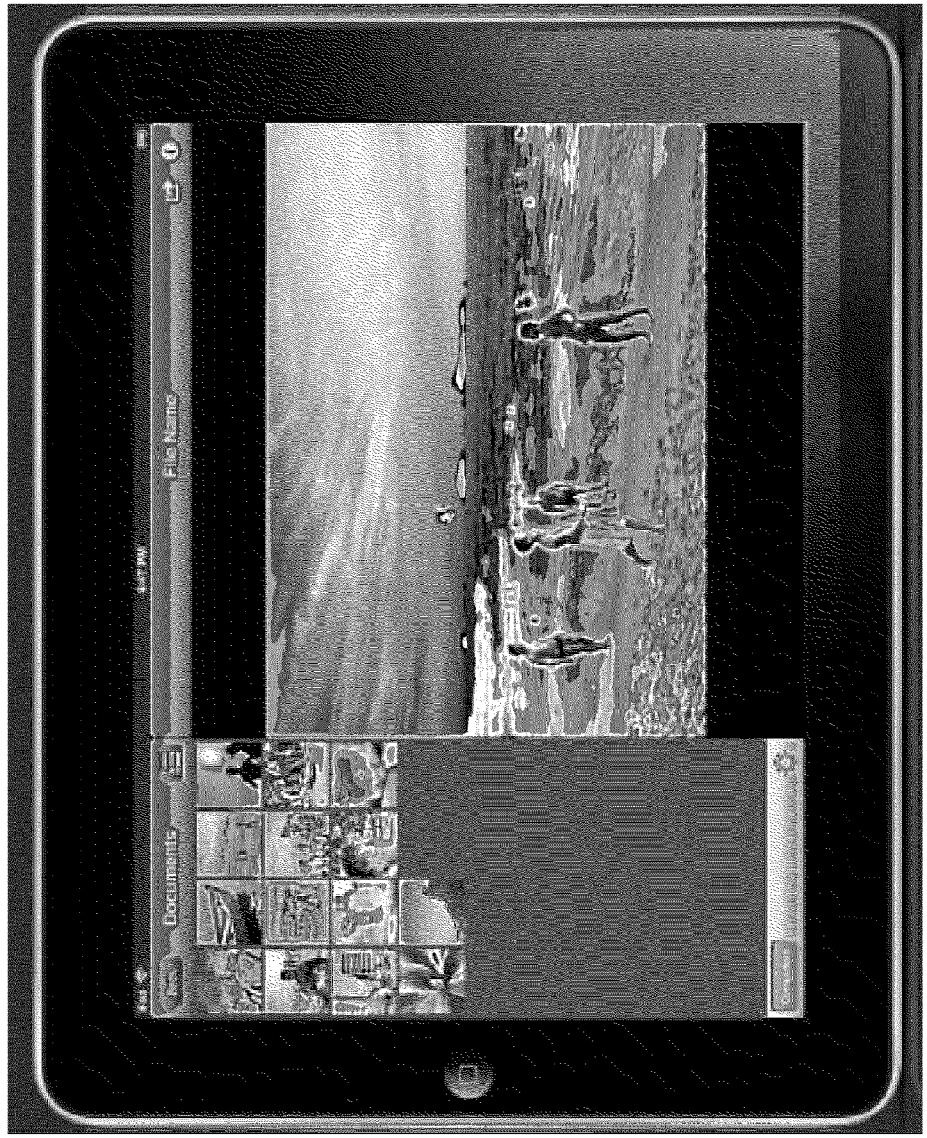
Figure 20I:

A user interface 2000*g* illustrated in FIG. 20G allows the user to view various information associated with a backed-up file including file type (e.g., JPEG Image), size of the file, location, creation date and time, and last modification date and time. Similar to the user interface 1900*i* in FIG. 19I, user interfaces 2000*h* and 2000*i* illustrated in FIGS. 20H and 20I allow the user to view the picture files as thumbnails.

The above-described systems and methods are configured be implemented in digital electronic circuitry, in computer hardware, firmware, and/or software. The implementation includes a computer program product (i.e., a computer program tangibly embodied in an information carrier). The implementation may, for example, be in a machine-readable storage device, for execution by, or to control the operation of, data processing apparatus. The implementation may, for example, be a programmable processor, a computer, and/or multiple computers.

A computer program is written in any form of programming language, including compiled and/or interpreted languages, and the computer program is deployed in any form, including as a stand-alone program or as a subroutine, element, and/or other unit suitable for use in a computing environment. A computer program is deployed to be executed on one computer or on multiple computers at one site.

Method steps are performed by one or more programmable processors executing a computer program to perform functions of the invention by operating on input data and generating output. Method steps are also performed by and an apparatus is implemented as special purpose logic circuitry. The circuitry includes a FPGA (field programmable gate array) and/or an ASIC (application-specific integrated circuit). Modules, subroutines, and software agents refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer includes, is operatively coupled to receive data from and/or transfer data to one or more mass storage devices for storing data (e.g., magnetic, magneto-optical disks, or optical disks).

Data transmission and instructions also occur over a communications network. Information carriers suitable for embodying computer program instructions and data include all forms of non-volatile memory, including by way of example semiconductor memory devices. The information carriers include, for example, EPROM, EEPROM, flash memory devices, magnetic disks, internal hard disks, removable disks, magneto-optical disks, CD-ROM, and/or DVD-ROM disks. The processor and the memory are configured to be supplemented by, and/or incorporated in special purpose logic circuitry.

To provide for interaction with a user, the above described techniques are implemented on a computer having a display device. The display device includes, for example, a cathode ray tube (CRT) and/or a liquid crystal display (LCD) monitor. The interaction with a user includes, for example, a display of information to the user and a keyboard and a pointing device (e.g., a mouse or a trackball) by which the user provides input to the computer (e.g., interact with a user interface element). Other kinds of devices are used to provide for interaction with a user. Other devices provide feedback to the user in any form of sensory feedback (e.g., visual feedback, auditory feedback, or tactile feedback). Input from the user is received in any form, including acoustic, speech, and/or tactile input.

The above described techniques are implemented in a distributed computing system that includes a back-end component. The back-end component is configured to be a data server, a middleware component, and/or an application server. The above described techniques are implemented in a distributing computing system that includes a front-end component. The front-end component is configured to be a client computer having a graphical user interface, a Web browser through which a user interacts with an example implementation, and/or other graphical user interfaces for a transmitting device. The components of the system are interconnected by any form or medium of digital data communication (e.g., a communication network). Examples of communication networks include a local area network (LAN), a wide area network (WAN), the Internet, wired networks, and/or wireless networks.

The system includes clients and servers. A client and a server are generally remote from each other and typically interact through a communication network. The relationship of client and server arises by virtue of computer programs running on the respective computers and having a client-server relationship to each other.

The communication networks include, for example, packet-based networks and/or circuit-based networks. Packet-based networks include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device includes, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and may include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, an object, an executable, a thread of execution, a program, and/or a computer. By way of illustration, both an application running on a computing device and the computing device may be a component. One or more components reside within a process and/or thread of execution and a component is configured to be localized on one computer and/or distributed between two or more computers. In addition, these components execute from various computer readable media having various data structures stored thereon. The components communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein are implemented in hardware, software, firmware, or any combination thereof. If implemented in software, the functions are stored on or transmitted over as one or more instructions or code on a computer-readable medium. Computer-readable media is non-transitory in nature and includes both computer storage media and communication media including any medium that facilitates transfer of a computer program from one place to another. A storage media is any available media accessed by a computer. By way of example, and not limitation, such computer-readable media comprise RAM, ROM, EEPROM, CD-ROM or other optical disk storage, magnetic disk storage or other magnetic storage devices, or any other medium that used to carry or store desired program code in the form of instructions or data structures and that are accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. In a user device comprising at least one processor, at least one memory, and at least one communication interface, a computer-implemented method for facilitating remote access to a backed-up data file stored on a second user device, the backed-up data file being backed-up on a data center communicatively coupled to a backup system management server, the method comprising:
    A) receiving a request from a user interface to view the backed-up data file, wherein the user interface is accessed by the user from the user device;
    B) retrieving a cache entry corresponding to the backed-up data file from a cache stored in the at least one memory;
    C) responsive to receiving the request from the user interface, displaying cached contents of the backed-up data file to the user in the user interface using the retrieved cache entry prior to validating the cache entry with the backup system management server, and prior to determining whether any connection exists with the backup system management server;
    D) subsequently transmitting a request to the backup system management server while displaying the cached contents of the backed-up data file to the user, the request including at least one data associated with the cache entry;
    E) receiving a response from the backup system management server including a new copy of the backed-up data file different than the backed-up data file stored in the at least one memory;
    F) upon receiving the new copy of the backed-up data file, updating the cache entry with the new copy of the backed-up data file; and
    G) updating the display of the cached contents of the backed-up data file in the user interface with contents of the new copy of the backed-up data file, responsive to receiving the response from the backup management server including the new copy of the backed-up data file.

2. The method of claim 1, wherein the at least one data includes a last backup date and time associated with the backed-up data file.

3. The method of claim 1, wherein the at least one data includes a hash value associated with the backed-up data file.

4. The method of claim 1, wherein
    the backed-up data file is backed-up as one or more backed-up data segments stored on the data center.

5. The method of claim 4, wherein the backup system management server is configured to
    read from at least one memory of the backup system management server a backup status file corresponding to the backed-up data file, the backup status file generated by the second user device and including first information relating to a location in the data center of the one or more backed-up data segments;
    receive from the data center, based at least in part on the first information, the one or more backed-up data segments;
    assemble the one or more backed-up data segments, based at least in part on the first information, so as to generate at least a reassembled portion of the backed-up data file, and
    transmit to the user device at least the reassembled portion of the new copy of the backed-up data file.

6. The method of claim 5, wherein the first information of the backup status file includes mapping information for each of the one or more backed-up data segments.

7. The method of claim 6, wherein the mapping information includes byte ranges.

8. The method of claim 5, wherein the second information of the backup status file includes storage identifying information for each of the one or more backed-up data segments.

9. The method of claim 8, wherein the storage identifying information includes computer information associated with the second user device, session information, file identification information, and file version information.

10. The method of claim 5, wherein the backup status file includes file format for each of the one or more backed-up data segments.

11. The method of claim 5, wherein the backup status file includes a last backup date associated with the first backed-up data file.

12. The method of claim 5, wherein the backup status file includes a last modification date associated with the first backed-up data file.

13. The method of claim 5, wherein the one or more backed-up data segments are individually encrypted using an encryption key provided by the user.

14. An apparatus for facilitating remote access from a user device to a backed-up data file stored on a first user device, the backed-up data file being backed-up as one or more backed-up first file segments stored on a data center communicatively coupled to the backup system management server, the apparatus comprising:

at least one communications interface;

at least one memory to store processor-executable instructions; and at least one processor communicatively coupled to the at least one communications interface and the at least one memory, wherein upon execution of the processor-executable instructions, the at least one processor:
- A) receives a request from a user interface to view the backed-up data file, wherein the user interface is accessed by the user from the user device;
- B) retrieves a cache entry corresponding to the backed-up data file from a cache stored in the at least one memory;
- C) responsive to receiving the request from the user interface, displays cached contents of the backed-up data file to the user in the user interface using the retrieved cache entry prior to validating the cache entry with the backup system management server, and prior to determining whether any connection exists with the backup system management server;
- D) subsequently transmits a request to the backup system management server while displaying the cached contents of the backed-up data file to the user, the request including at least one data associated with the backed-up data file stored in the at least one memory;
- E) receives a response from the backup system management server including a new copy of the backed-up data file different than the cache entry;
- F) upon receiving the new copy of the backed-up data file, updates the cache entry with the new copy of the backed-up data file; and
- G) updates the display of the cached contents of the backed-up data file in the user interface with contents of the new copy of the backed-up data file, responsive to receiving the response from the backup management server including the new copy of the backed-up data file.

15. The apparatus of claim 14, wherein the at least one data includes a last backup date and time associated with the backed-up data file.

16. The apparatus of claim 14, wherein the at least one data includes a hash value associated with the backed-up data file.

17. The apparatus of claim 14, wherein the backed-up data file is backed-up as one or more backed-up data segments stored on the data center.

18. The apparatus of claim 17, wherein the backup system management server is configured to
- read from at least one memory of the backup system management server a backup status file corresponding to the backed-up data file, the backup status file generated by the second user device and including first information relating to a location in the data center of the one or more backed-up data segments;
- receive from the data center, based at least in part on the first information, the one or more backed-up data segments;
- assemble the one or more backed-up data segments, based at least in part on the first information, so as to generate at least a reassembled portion of the backed-up data file, and
- transmit to the user device at least the reassembled portion of the new copy of the backed-up data file.

19. The apparatus of claim 18, wherein the first information of the backup status file includes mapping information for each of the one or more backed-up data segments.

20. The apparatus of claim 19, wherein the mapping information includes byte ranges.

21. The apparatus of claim 18, wherein the second information of the backup status file includes storage identifying information for each of the one or more backed-up data segments.

22. The apparatus of claim 21, wherein the storage identifying information includes computer information associated with the second user device, session information, file identification information, and file version information.

23. The apparatus of claim 18, wherein the backup status file includes file format for each of the one or more backed-up data segments.

24. The apparatus of claim 18, wherein the backup status file includes a last backup date associated with the first backed-up data file.

25. The apparatus of claim 18, wherein the backup status file includes a last modification date associated with the first backed-up data file.

26. The apparatus of claim 18, wherein the one or more backed-up data segments are individually encrypted using an encryption key provided by the user.

27. At least one non-transitory computer readable storage medium encoded with processor-executable instructions that, when executed by at least one processor, perform a method for facilitating remote access to a backed-up data file stored on a second user device, the first backed-up data file being backed-up on a data center communicatively coupled to a backup system management server, the method comprising:
- A) receiving a request from a user interface to view the backed-up data file, wherein the user interface is accessed by the user from the user device;
- B) retrieving a cache entry corresponding to the backed-up data file from a cache stored in the at least one memory;
- C) responsive to receiving the request from the user interface, displaying cached contents of the backed-up data file to the user in the user interface using the retrieved cache entry prior to validating the cache entry with the backup system management server, and prior to determining whether any connection exists with the backup system management server;
- D) subsequently transmitting a request to the backup system management server while displaying the cached contents of the backed-up data file to the user, the request including at least one data associated with the backed-up data file stored in the at least one memory;
- E) receiving a response from the backup system management server including a new copy of the backed-up data different than the cache entry;
- F) upon receiving the new copy of the backed-up data file, updating the cache entry with the new copy of the backed-up data file; and
- G) updating the display of the cached contents of the backed-up data file in the user interface with contents of the new copy of the backed-up data file, responsive to receiving the response from the backup management server including the new copy of the backed-up data file.

* * * * *